April 10, 1962 — E. DURHAM ET AL — 3,028,844
CONTROL SYSTEMS
Filed Nov. 26, 1952 — 11 Sheets-Sheet 1

INVENTORS
EDWIN DURHAM
AND HARRY E. WEAVER
BY
Raymond W. Jenkins
ATTORNEY

INVENTORS
EDWIN DURHAM AND HARRY E. WEAVER
BY
Raymond W. Junkin
ATTORNEY

INVENTORS
EDWIN DURHAM
AND HARRY E. WEAVER
BY
Raymond W. Junkin
ATTORNEY

INVENTORS
EDWIN DURHAM
AND HARRY E. WEAVER
BY
Raymond W. Jenkins
ATTORNEY

INVENTORS
EDWIN DURHAM
AND HARRY E. WEAVER
BY Raymond D. Junkins
ATTORNEY

United States Patent Office 3,028,844
Patented Apr. 10, 1962

3,028,844
CONTROL SYSTEMS
Edwin Durham, Westfield, N.J., and Harry E. Weaver, South Euclid, Ohio; said Durham assignor to The Babcock & Wilcox Company, New York, N.Y., a corporation of New Jersey, and said Weaver assignor to Bailey Meter Company, a corporation of Delaware
Filed Nov. 26, 1952, Ser. No. 322,646
23 Claims. (Cl. 122—479)

Our invention lies in the field of steam power generation and particularly in the control of steam temperature in connection with present day vapor generators. Practically all central station capacity presently being installed, or on order, in the United States, has rated steam conditions above 800 p.s.i.g. and 800 FTT; the higher operating temperature being 1050 FTT at pressures from 1500 p.s.i.g. to 2000 p.s.i.g. and rated load from 500,000 to 1,000,000 lb. per hr. The problems involved in the generation and close control of the properties of steam are quite different now than was the case at the time of the inventions in this field which are shown in the prior art. In such plants, the upper limit of superheat temperature is governed by the materials and construction of the turbines served by the steam. In the interest of turbine efficiency, the temperature of the steam delivered to the turbine should be maintained within close optimum limits throughout a wide range of operation.

With the superheating or resuperheating of the steam in one or more convection type heat exchange surfaces, the size and cost of such surfaces becomes a material factor in the total cost of the unit and any improvement leading to a reduction in the size of superheaters becomes of considerable importance. Usually these surfaces must be made of expensive high chrome-nickel alloy tubing to satisfactorily handle the temperatures and pressures encountered.

It is thus a prime desideratum, in the design of such a unit, to proportion the steam generating surfaces and the steam superheating surfaces to give a desired final steam temperature at "rated load." At "peak load," in excess of the rated load, the final steam temperature will be in excess of that desired while at lower ratings the steam temperature will not equal that desired. This is due to the characteristic curve of convection type heat exchangers which have a rising function with load (FIG. 3). It is false economy to design the superheater for desired final steam temperature at "peak load," for at all loads below that value, the unit would produce steam which is below the desired final temperature. On the other hand, the design of a superheater to produce the desired final steam temperature at some rating below "rated load" would require an excessive cost of superheating surface and an excessive final steam temperature throughout the upper ratings, with consequent danger to the turbine or the necessity of extracting some of the surplus heat from the superheated steam.

To reach the desired high superheated steam temperature, but not to exceed it, requires careful proportioning of the heat absorbing surfaces both for generating steam and for superheating it. But even if the desired temperature be just attained initially by very careful designing at "rated load," the temperature will vary during operation by reason of changes in cleanliness of the heat absorbing surfaces. Slag will form and adhere to the heat absorbing surfaces in the furnace thereby reducing the effectiveness of such surfaces and raising the furnace outlet temperature of the products of combustion. Furnace outlet temperature may also change with percentage of excess air supplied for combustion, with the characteristics of the fuel burned, and with the rate of combustion and the corresponding rate of steam generation. All of these things will therefore affect the temperature of the gases, whether the superheating elements are located in the furnace where they absorb heat by radiation from the burning fuel and products of combustion, or whether they are located beyond the furnace where they absorb heat by convection only from the products of combustion.

With the furnace volume, as well as the vapor generating furnace surface, and the vapor superheating surface, fixed and invariable, the possibility of satisfactorily controlling the final steam temperature lies in controlling the volume and temperature of the gases contacting the superheating surfaces. Fuel and air supply must be varied with rating or demand to provide the desired steam flow rate and the desired steam pressure. The furnace temperature of the flame and products of combustion does not vary greatly with rating. This leaves the controllable variables as the mass and temperatures of the gases entering the convection superheating surfaces.

For any given furnace, as load increases, the rate of heat absorption does not increase as rapidly as the rate of heat liberation; therefore, the furnace leaving temperature will rise. With both the quantity rate and the temperature of the gases leaving the furnace increasing with load, it is apparent that a fixed surface convection superheater will receive a greater heat rate at higher loads than at lower loads and the heat transfer area is usually designed for receiving the volume and temperature of leaving gases at "rated load." Any further increase in the heat release rate supplies to the fixed superheater surface more heat by gas volume and by gas temperature than it is designed for and a corresponding excess final steam temperature is experienced. On the other hand, at operation below the rated load, the fixed superheater surface receives less volume and a lower temperature of gases leaving the furnace with a corresponding lowering of final steam temperature. It is therefore, a principal object of our present invention to provide an improved method and apparatus for extracting excess heat from the steam at high rating and for supplying additional heat to the steam at low ratings, to the end that thet final steam temperature will approximate a uniform value over a range of ratings at each side of the "rated load" value.

We preferably consider a unit which has been designed to provide the desired final steam temperature at "rated load." Throughout an upper range of rating between the "rated load" and a "peak load," we apply water spray attemperation. As rating decreases, below "rated load," we controllably decrease the percentage of liberated heat which is absorbed by the radiant generating surfaces. At the same time the mass flow of the gases of combustion is increased, to the end that a greater proportion of the liberated heat is delivered to the convection superheating surfaces than would otherwise be the case. This control of the mass flow of combustion gases entering the superheating surfaces is accomplished by recirculating to the furnace a variable proportion of partially cooled products of combustion abstracted from the inlet side of the air heater. The exact location of entrance of the recirculated gases to the furnace is not a part of the present invention.

A principal object of our invention is to provide an improved method and control system effective in positioning attemperator control valves and in controlling the recirculation rate of gases.

Recirculation of partially cooled products of combustion is not a new device. With a water-cooled furnace it is known that the heat availability of the gases at the entrance to convection superheating surfaces is increased when the percentage recirculated is increased as rating decreases. This may be due to relative increase in gas temperature and/or mass flow. The lower rating end of the convection characteristic curve is raised while the upper end may actuatlly be lowered. The controlled change in temperature and/or mass flow rate of the gases leaving the furnace may result from different effects of the introduction of recirculated gases at different furnace locations. One theory that has been advanced is of delayed combustion and change in temperature of the combustion process. Another is the blanketing or shielding effect of the recirculated gases between the combustion process and the radiant receiving walls of the furnace proper. Still other causes may be the dilution of the fresh products of combustion and the heating up of the recirculated gases. As the rating decreases from "rated load" the rate of gas recirculation is increased, thus relatively decreasing the absorption of heat by the radiant generating surface while relatively increasing the heat flow rate of the gases leaving the combustion zone and entering the superheating surfaces. The present invention provides a control of the recirculation of products of combustion to lower the radiant heat absorption with decrease in rating and thus to increase the heat flow rate of the gases leaving the furnace and entering the superheating surfaces.

At loads above the control point load, convection superheaters and reheaters naturally tend to effect too high a steam temperature, by absorbing too much heat. Bypassing some of the gases about the superheater and reheater surfaces could be effected as a means of avoiding such excessive heat absorption. This, however, involves expensive and spacious structural provisions, and the provision of gas flow control dampers which are subject to operating difficulties. This type of corrective measure is also somewhat sluggish in its response to control variables.

Spray attemperation is preferable as a temperature corrective measure because of its simplicity in construction, ease of operation, and low gas pressure drop. It has, however, had the disadvantage that it has a tendency to effect a loss in overall steam turbine plant efficiency because of the latent heat loss to the condenser of the vapor resulting from the reheat attemperator admixture without the advantage of expansion of that vapor through the high pressure turbine. This invention provides for the spray attemperation of steam, with the minimization, or avoidance of the use of reheater spray attemperation, while effecting optimum concurrent control of both the high pressure superheated steam temperatures and the reheated steam temperatures.

The present invention provides for the absorption of heat by the superheater and by the reheater by placing them in separated controlled gas paths arranged for parallel flow. Spray attemperators are arranged in connection with both the superheater and the reheater. At a load where the heat carried by the gases going over the superheating and reheating surfaces is of such an amount as to result in an excessive absorption by the superheating and reheating surfaces, we regulate the gas flow over the reheater so that it will absorb just sufficient heat to bring the final temperature to the desired value. This will result in a gas flow over the superheater surface which will raise the superheater absorption such that if uncontrolled it will give a delivered steam temperature in excess of the optimum, but we reduce this excess by spray attemperation in the superheater section.

From an operating standpoint it is undesirable to create too wide an unbalance of gas flow through the reheater and superheater passes, particularly as an attempt to transmit too much heat to the superheater metal may result in its temperature becoming excessive, and it is therefore contemplated that, under abnormal operating conditions, before maximum overload steam output is reached and for a narrow overload range, some degree of spary attemperation may be carried on in connection with the reheater. As the overload range in the normal loading of a steam plant would be reached infrequently, the effect on the overall plant economy will not amount to much.

The installation of a spray attemperator associated with the reheater with provision to automatically bring it into operation should the temperature become excessive at the reheater outlet, is advantageous from a safety standpoint in giving full protection against high temperatures which might otherwise damage the steam turbine, reheater and transmission system.

In the load range below the control point where gas recirculation is used as a means to raise the proportion of total heat remaining in the gases leaving the furnace, we utilize gas flow control dampers associated with parallel passes containing superheater and reheater surfaces for the purpose of directing an adequate proportion of gas through the reheater pass. This method of damper operation in the low load range below the control point is the reverse of that of the high load range, in that the reheater damper is open and the proportionate gas flow control is by the damper associated with the outlet of the superheater pass.

Our present invention has as a primary object the provision of method and apparatus for operating, or controlling the operation of, such a vapor generating unit through the utilization of more advantageous indexes of heat availability to the convection superheaters and of operation of the unit as a whole.

Figure 1:
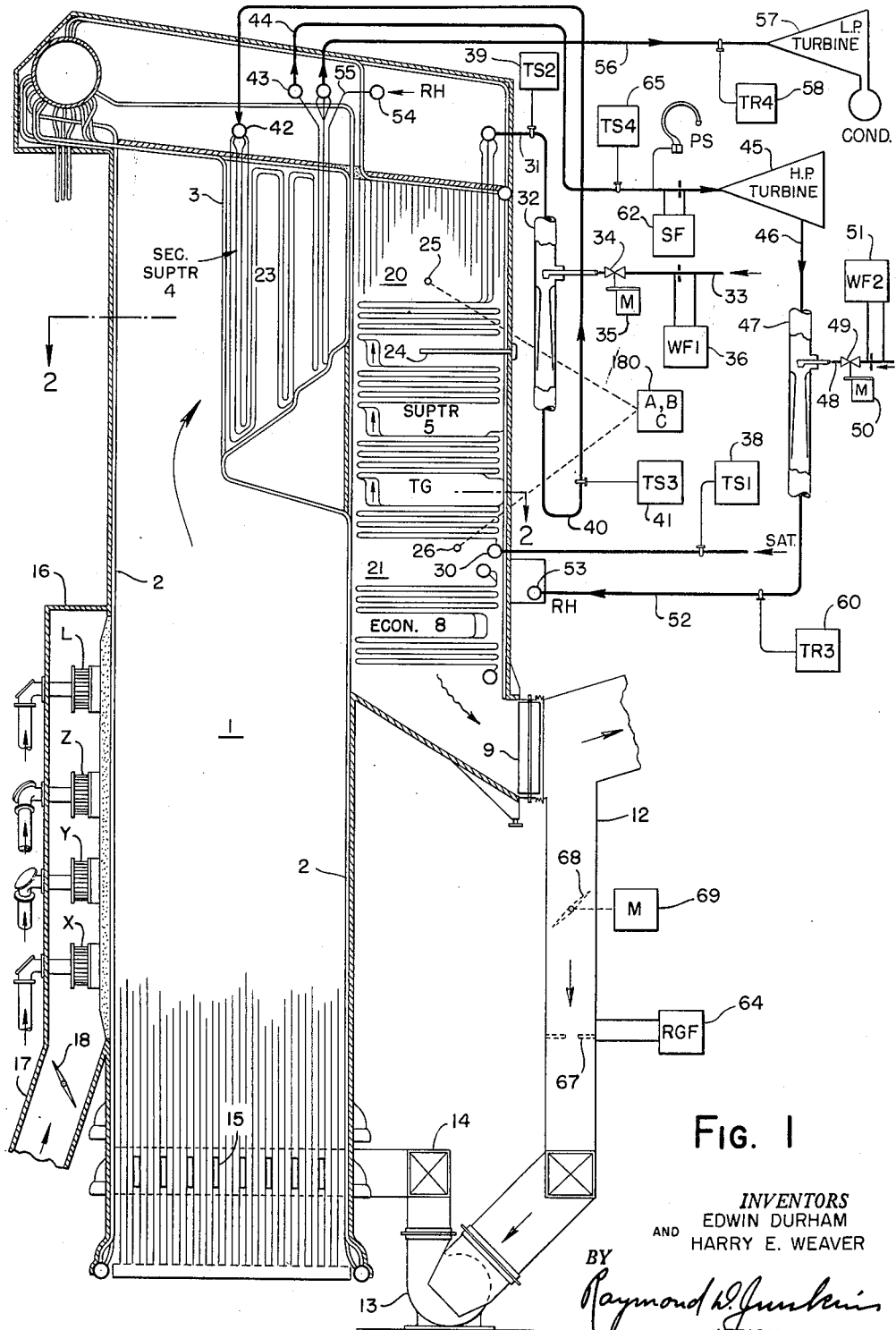
FIG. 1 is a sectional elevation of a vapor generating and superheating unit having reheat surface and employing recirculation, attemperation and gas distribution.
Figure 2:
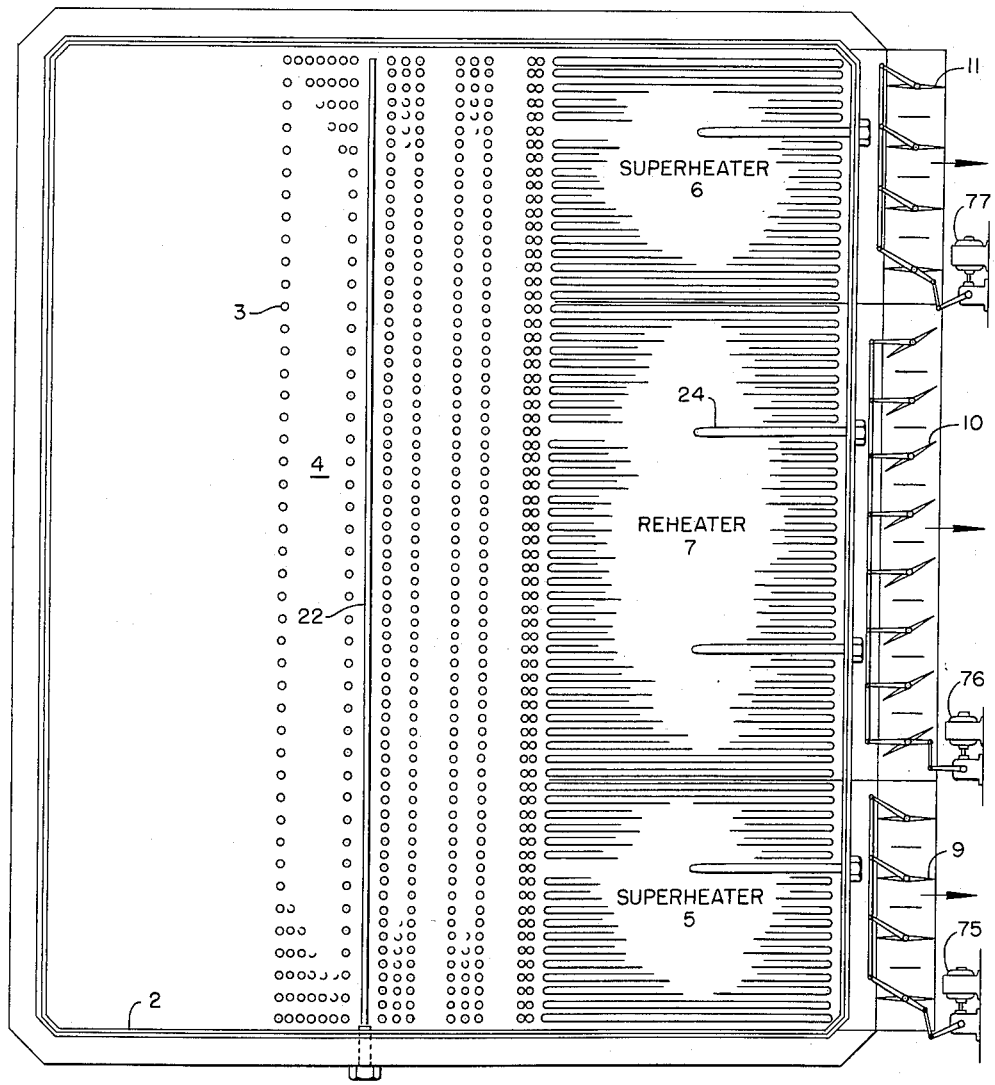
FIG. 2 is a section along the line 2—2 of FIG. 1 in the direction of the arrows.
Figure 6:
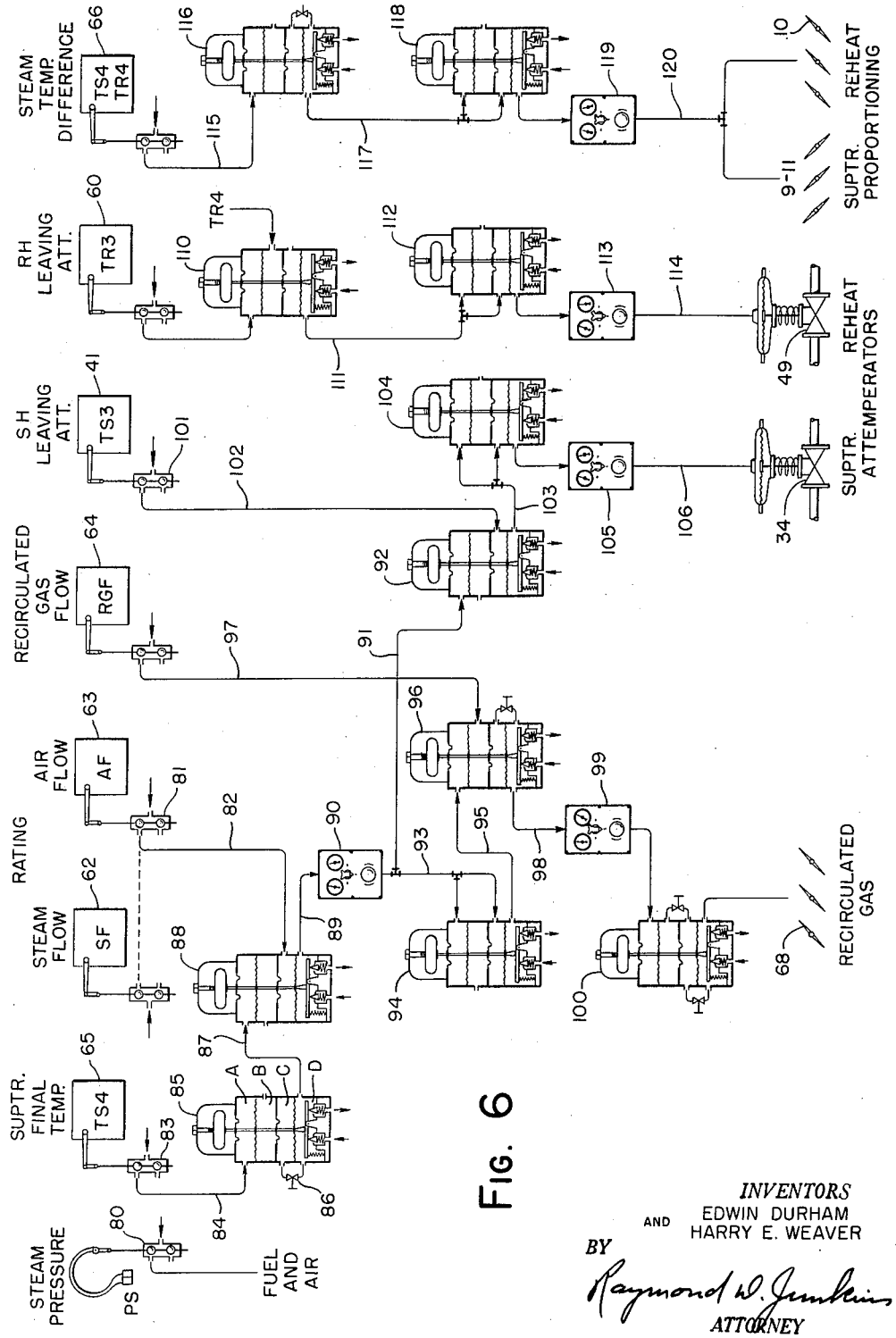

FIG. 6 diagrammatically illustrates a pneumatic control system for a unit such as the one of FIGS. 1 and 2, having a single steam circuit wtih spray attemperation in both the superheating and reheating portions of the circuit, with gas recirculation, and with gas proportioning over the parallel superheater and reheater paths.

Figure 7:
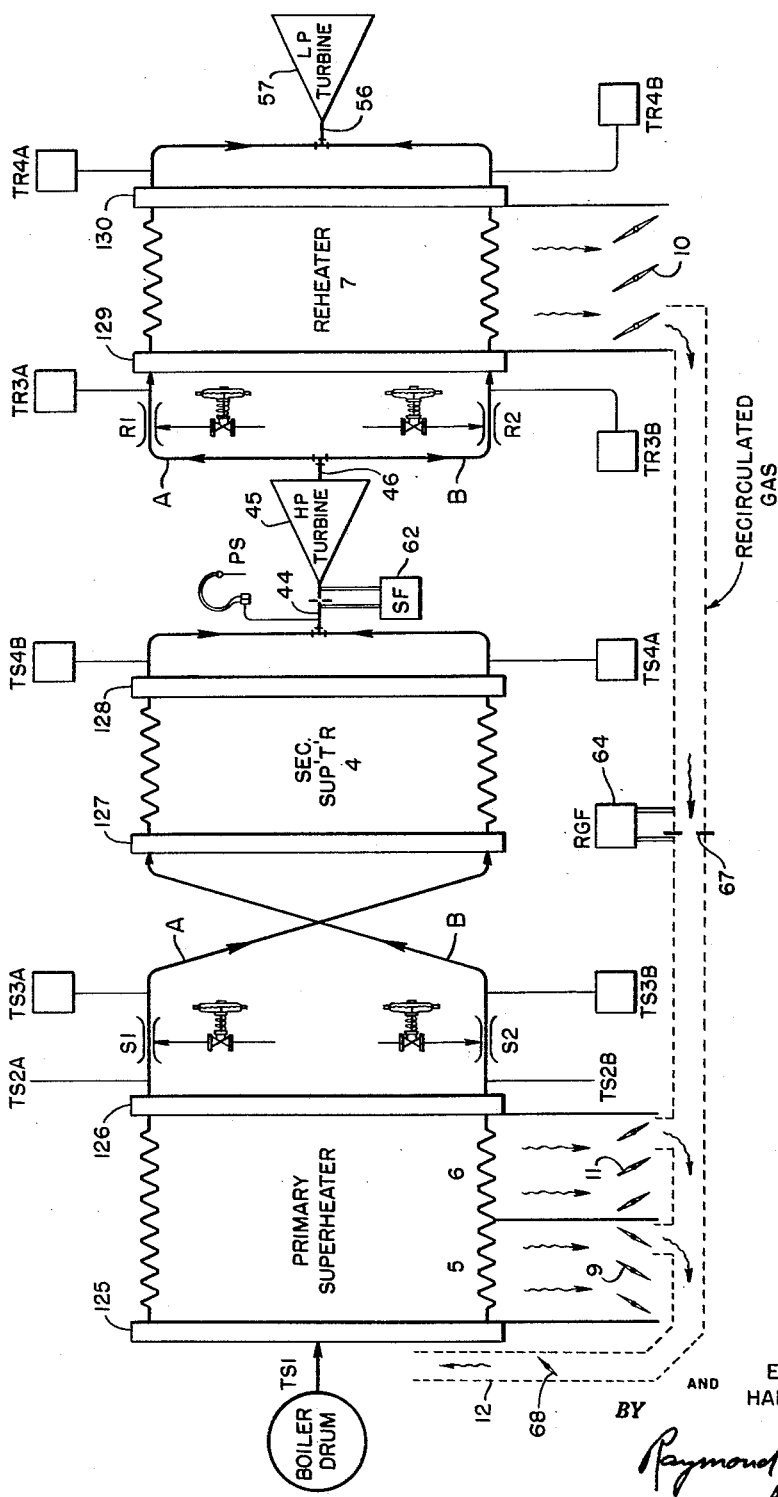

FIG. 7 illustrates the steam and gas paths of a twin circuit vapor generating, superheating and reheating unit employing recirculation, attemperation, and gas distribution over the parallel paths.

Figure 8:
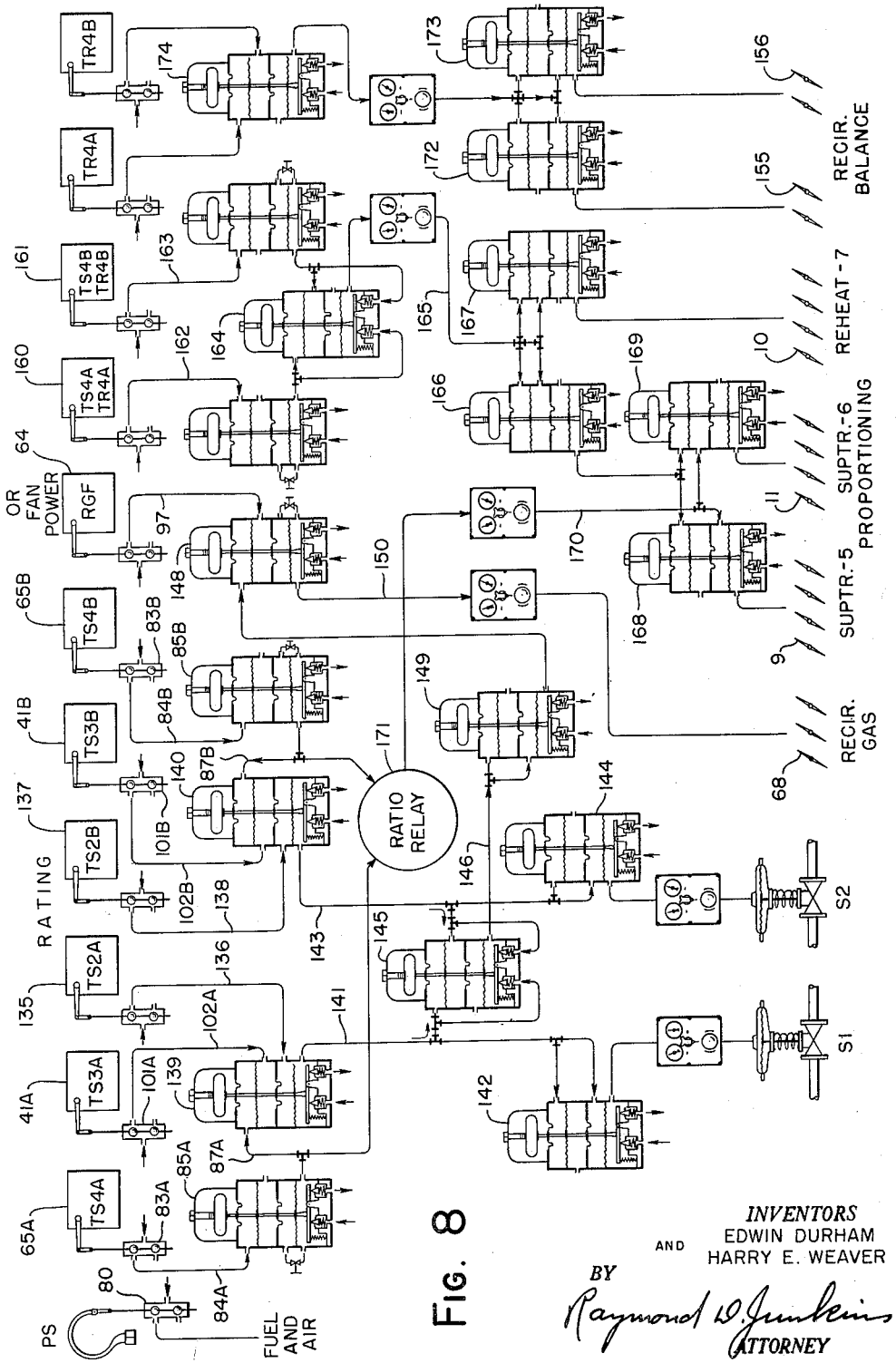

FIG. 8 illustrates diagrammatically a pneumatic control system for a twin circuit vapor generating, superheating and reheating unit employing gas recirculation, attemperation in only the superheating portion of the twin circuits, and gas distribution between the parallel superheating and reheating gas paths.

Figure 9:
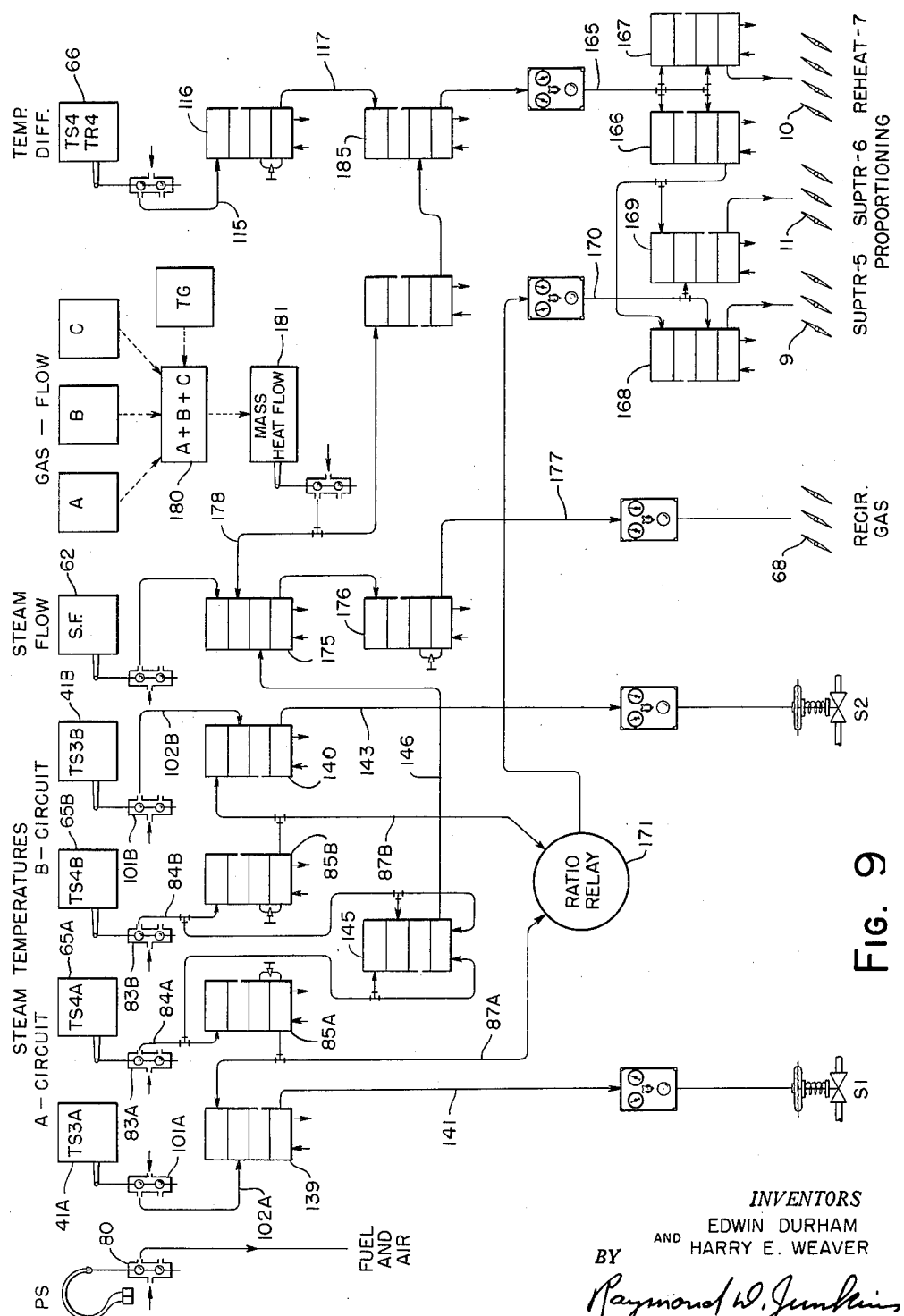

FIG. 9 illustrates a pneumatic control system, somewhat similar to that of FIG. 8, but differing as to certain of the indexes used as well as the general method and apparatus of automatic control.

Figure 10:
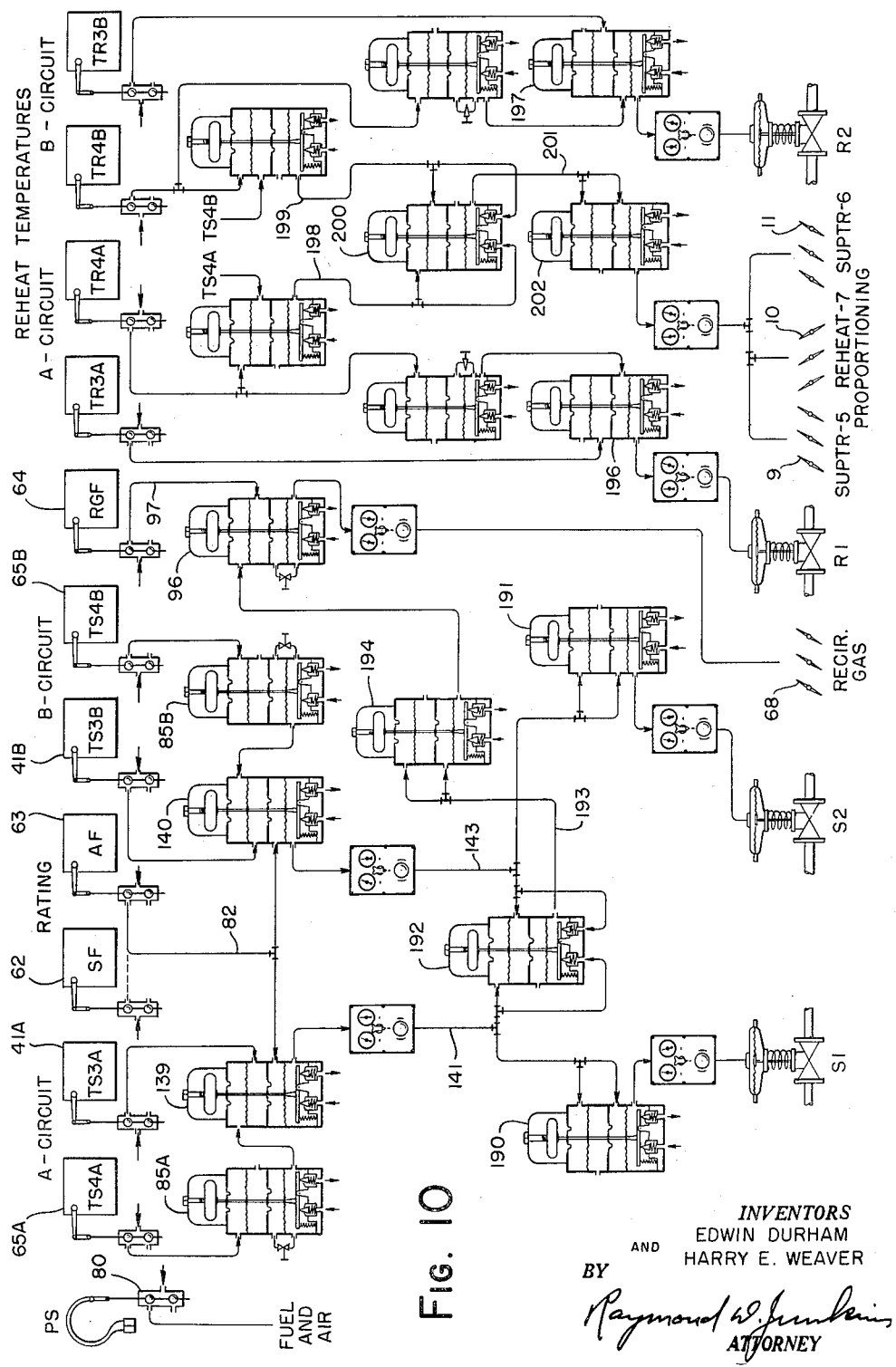

FIG. 10 represents a pneumatic control system for a twin circuit unit employing attemperation in the superheating portion and with the possibility of attemperation in the reheating portion of the circuit.

Figure 11:
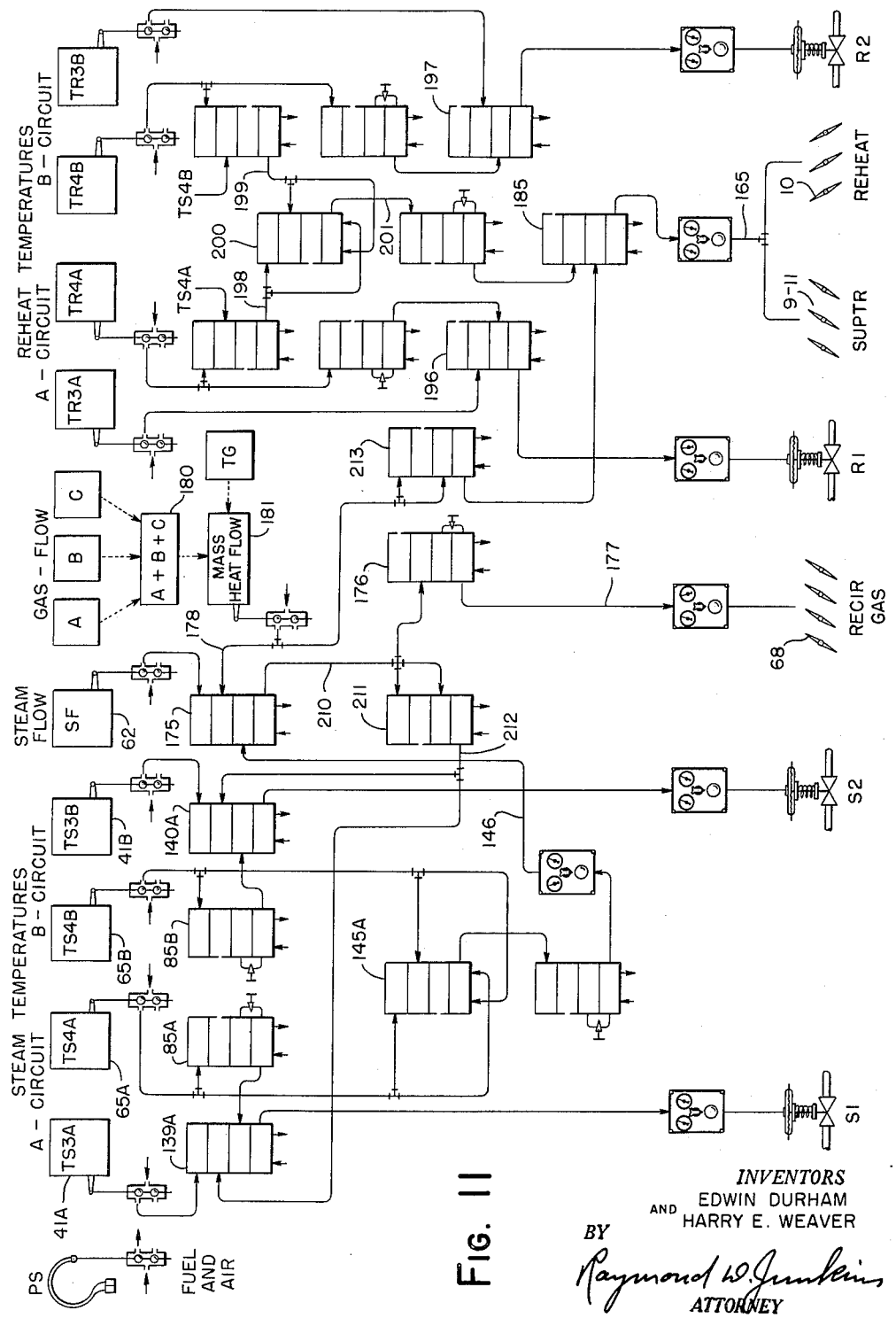

FIG. 11 illustrates a pneumatic control system somewhat like that of FIG. 10 but differing therefrom in certain respects.

Figure 12:
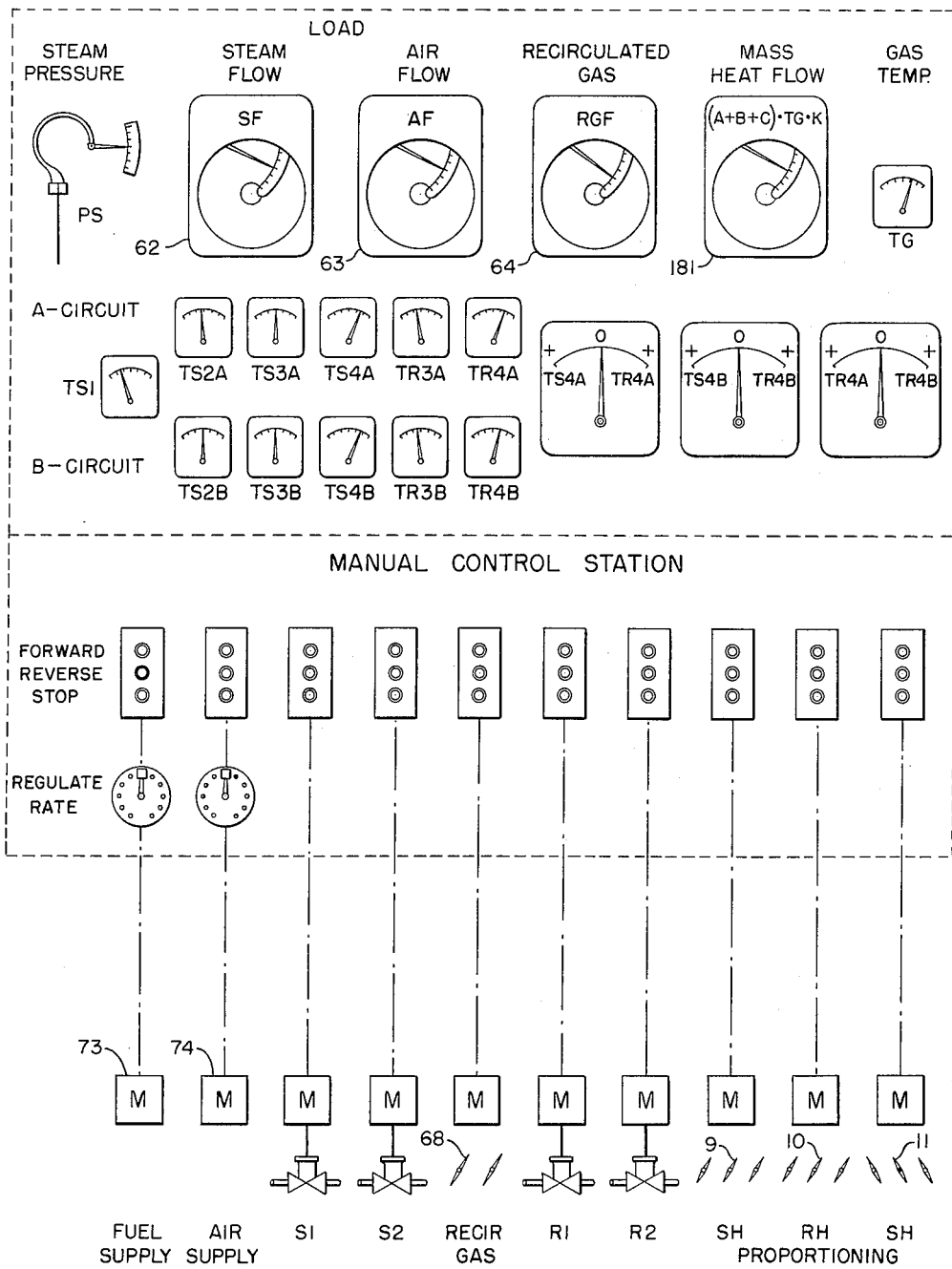

FIG. 12 illustrates a manual control station for regulating the operation of a twin circuit vapor generating, superheating and reheating unit.

Referring now to FIG. 1 we show therein in diagrammatic form, and not necessarily to scale, a vapor generating, superheating and reheating unit in connection with which we will explain our invention. While this figure of the drawing shows, for illustrative purposes, only a single steam circuit it will be appreciated that the same general structural arrangement of FIGS. 1 and 2 may be such that the twin circuit of FIG. 7 may be applied. Thus the description pertaining to FIGS. 1 and 2 is applicable to all of the other figures of the drawing when it be considered that such a structural unit may have either a single or a twin steam circuit. FIG. 2 is a section (to a larger scale), in the direction of the arrows, along the line 2—2 of FIG. 1. Reference may also be had at this time to FIGS. 3 and 4 which show the characteristic curves for steam superheating and reheating surfaces in a unit of this type.

The generator is of the radiant type, having a furnace 1 with walls 2 of vertical, closely spaced plain tubes constituting the vapor generating portion of the unit. Products of combustion pass upwardly through the furnace 1 in the direction of the arrow, through a tube screen 3, over a secondary superheating surface 4 and then through primary superheaters 5 and 6 and a reheater section 7. A tubular economizer 8 is followed by sets of adjustable dampers 9, 10, 11 (FIG. 2) of which dampers 9 are shown in FIG. 1. Following the dampers 9, 10, 11 the gaseous products of combustion may pass to an air heater, but, prior to the air heater, i.e. after dampers 9, 10 and 11, is the recirculation duct 12 joining the recirculation fan 13 which feeds a distribution duct 14 for a plurality of entrance ports 15.

Reference to FIG. 2 will show that the secondary superheater 4 is spanned by a primary superheater section 5, a reheater section 7 and a primary superheater section 6. Thus FIG. 1 shows a sectional elevation through the superheater 5 and also shows only the superheater dampers 9. The invention contemplates the desirable sequence of operation of dampers 9, 10, 11 to controllably vary the flow of products of combustion through the different heating sections for distribution of the heating gases over the primary superheater and the reheater.

The unit is fired by four horizontal rows of burners which we have designated as X, Y, Z and L. There may be one or more burners in each horizontal row and the burners are supplied with fuel from a plurality of mills. The additional secondary air for supporting combustion is supplied to the burner box 16 by a duct 17 under the control of a damper 18.

In a unit of the contemplated size the temperature of the heating gases first contacting the secondary superheater 4 will probably be in the range 1800–2200° F. Their temperature may be about 1500° F. at a location 20 between the reheater and primary superheater, and about 1000° F. at location 21 entering the economizer. Gas temperature at location TG is in a measurable range around 1200° F. In the present description we will discuss the use of measured gas temperatures with reference to the locations 20, TG and 21.

We have diagrammatically shown two forms that the gas temperature measuring instrumentalities may take. In FIG. 2 we indicate that we may put a temperature averaging sensitive device 22 across the width of the boiler at a location 23, or similarly at the location 20. It is true that the gases at location 23 have passed over a certain portion of the heating surfaces but a much more practical temperature is obtained here than at the furnace side of screen tubes 3 or even between the screen tubes and the first row tubes of the superheater 4. The temperature sensitive element 22 may be of the gas filled type or it may be a system of thermocouples or other devices for averaging the temperature across the path. In fact, it may consist of a bolometer system sighted across the path.

In FIG. 2 we show another arrangement wherein a series of temperature sensitive elements 24 may be spaced across the path and so connected as to average the temperature values if desired. In FIG. 1 we show one of the elements 24 and obviously the vertical location of elements 24 may be at the temperature measuring locations 20, TG, 21, or otherwise as desired.

For measuring the gas mass flow (to which reference will later be made) we indicate in FIG. 1 pressure connections 25, 26 leading to a mass flow rate meter designated as A, B, C. Preferably the drop in pressure through the sections 5, 7, 6 is sensed and thus we indicate three flow measuring devices which are designated respectively at A, B, C and are so indicated on other figures of the drawing wherein these three values are used in ascertaining mass heat flow for the three paths.

Following the steam flow path of FIG. 1, it will be noted that steam at saturation pressure and temperature, from the boiler separation drum, enters the primary superheaters 5, 6 through a header 30 and leaves them through a conduit 31 to a spray attemperator 32. Water for the spray of the attemperator 32 is admitted through a pipe 33 under control of a valve 34 positionable by a motive means 35, and the rate of supply of water (WF1) may be continually measured by an instrumentality 36. Temperature (TS1) of the steam reaching the header 30 is measured by an instrument 38 while temperature (TS2) of the steam entering the attemperator 32 is measured by device 39. Steam leaves the attemperator 32 through a conduit 40 and its temperature (TS3) is measured by a device 41. The conduit 40 joins a header 42 of the secondary superheater 4 and steam leaves the secondary superheater from a header 43, passing through a conduit 44 to the high pressure turbine 45. The weight rate of flow (SF) of the steam, the pressure (PS), and the final total temperature (TS4), are measured in the conduit 44 at the entrance to the high pressure turbine.

Steam at relatively low pressure and temperature leaves the high pressure turbine through a conduit 46 joining a spray attemperator 47 which is supplied with water through a pipe 48 under the control of a valve 49 positionable by a motive means 50, and the rate of supply (WF2) of water is continuously measured by a meter 51. Steam leaving the attemperator 47 passes through a conduit 52 to the reheater header 53 for the reheater section 7 from which the steam passes to the header 54, through the reheater loop 55, and to the outlet conduit 56 which supplies the low pressure turbine 57. Temperature (TR3) of the reheat steam entering the header 53 is measured by a device 60 while the final reheated temperature (TR4) is measured by the device 58.

Figure 5:
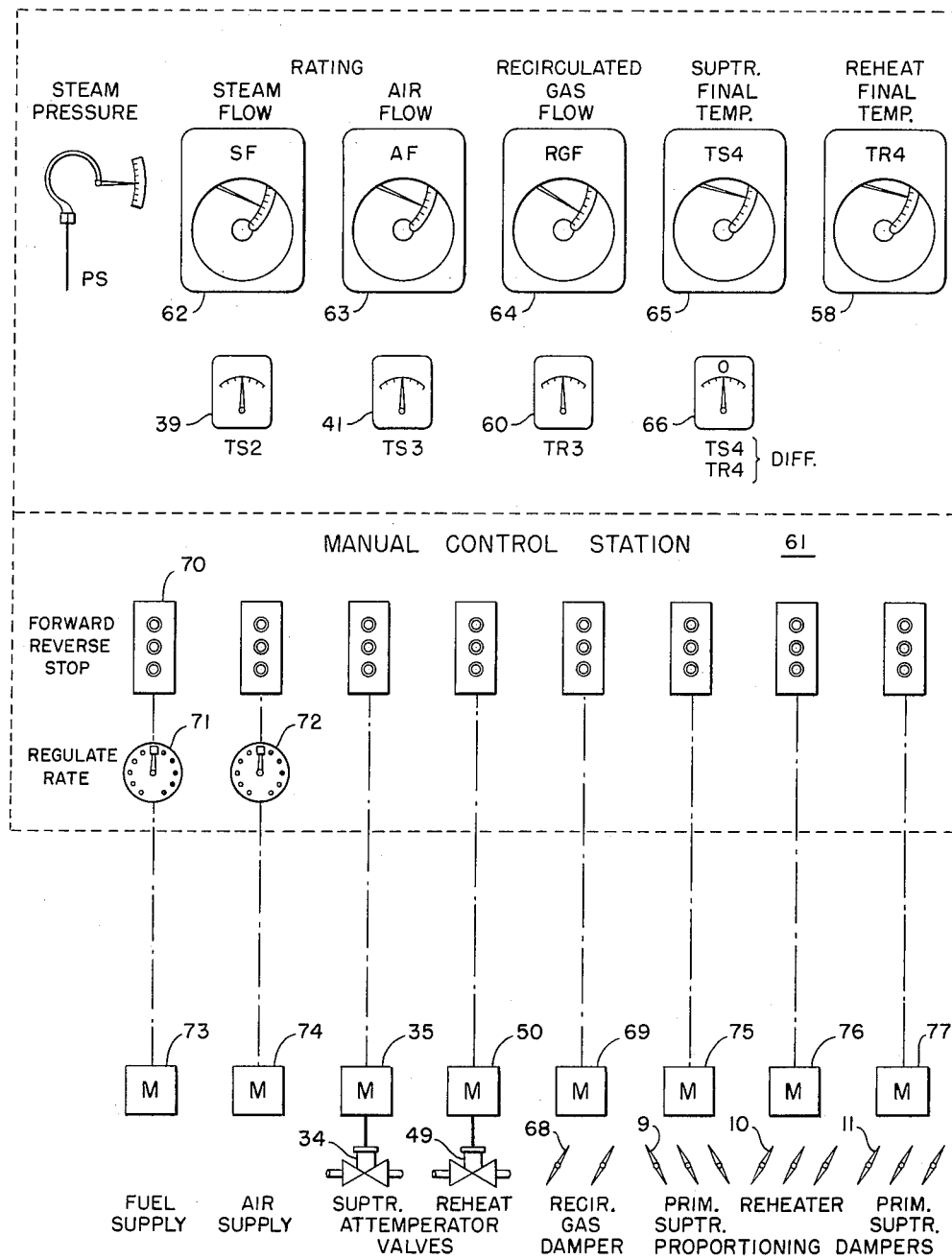
FIG. 5 illustrates a manual control station for regulating the operation of the unit of FIG. 1.

Reference may now be had to FIG. 5 which shows a manual control station 61 upon which are located instrumentalities mentioned in connection with FIG. 1 as well as the necessary pushbutton stations and rate regulating rheostats for remotely controlling the regulable devices for manually remotely operating the unit in accordance with our invention. On what may be the vertical portion of the control panel we show the steam pressure indicator PS, recorders 62 and 63 of steam flow and air flow, recorder 64 of recirculated gas flow, and recorders 65 and 58 of final superheated steam temperature and final reheated steam temperature respectively. Either steam flow or air flow may be used as an indication of load or rating and it will be understood that the air flow measurement in this instance does not include any portion of the recirculated products of combustion. In other words the air flow measurement is to be taken, preferably of the fresh air supplied to the furnace for combustion, at a location which does not include recirculated gases. The recirculated gas flow (RGF) is continually measured by a rate of flow meter 64 connected across an orifice 67 in the duct 12 and the rate of recirculation is controlled by a damper 68 positioned by a motive means 69. We further provide indicators 39, 41, 60 and 66 respectively of TS2, TS3, TR3 and TS4—TR4 difference.

On the bench-board portion of the control station 61 we provide forward-reverse-stop pushbutton stations 70 for each of the variables to be positioned remotely. In connection with the fuel supply and air supply we further provide rate regulating rheostats 71 and 72. It will now be evident that, through the agency of the pushbutton station 70 and rate regulator 71, the fuel supply means may be regulated to statisfy demand, through the remote operation of a motive means diagrammatically indicated at 73. Similarly the air supply may be proportioned to the fuel supply through the remote positioning of motive means 74. The superheater attemperator valve 34 is positionable by the motive means 35 while the reheater attemperator valve 49 is positionable by the motive means 50. It is evident that the various dampers 68, 9, 10, 11 are respectively positionable through the agency of the motive means 69, 75, 76 and 77.

The manual control station 61 is usually centrally located and is provided with electrical switches, etc. for controlling the motors and devices mentioned. It will now be clear that our improved method of operation of the unit may be manually performed by an operator located at the manual-control-station 61, observing the measuring instrumentalities and electrically remotely activating the controls for positioning the various supplies and dampers. Selective and/or sequential operation may be obtained as well as proper proportioning of the fuel and air supply.

Figure 3:
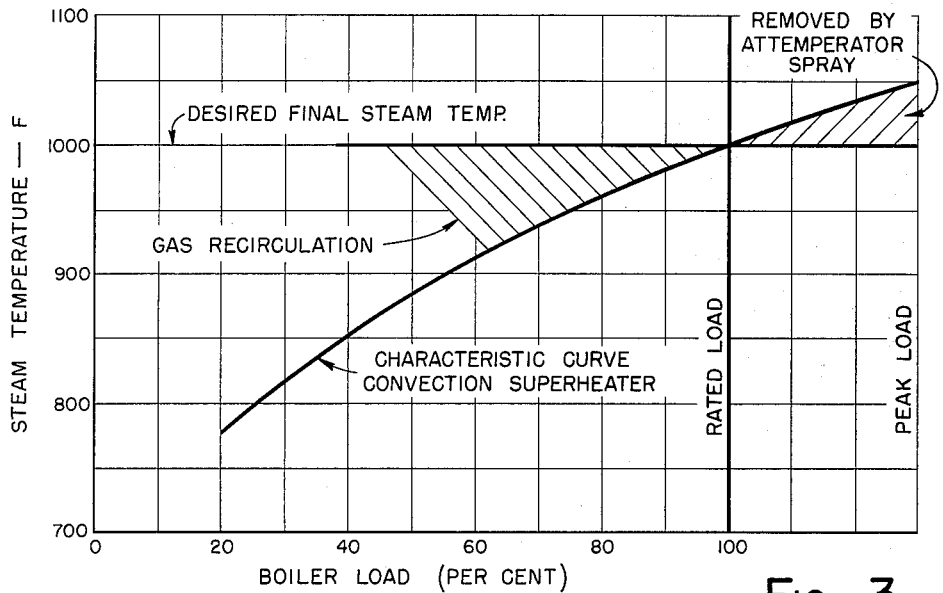
FIG. 3 is a graph of characteristics of a convection type superheater.

FIG. 3 shows the characteristic curve of convection superheating surface designed to provide a desired final steam temperature of 1000° F. at "rated load." Throughout an upper range of rating beyond the "rated load" the expected final steam temperature would be above the desired 1000° F. value and through this range we apply water spray attemperation to remove excess heat from the superheated steam. As rating decreases, below "rated load," we controllably decrease the percentage of liberated heat which is absorbed by the radiant generating surfaces by recirculating to the furnace a variable proportion of the partially cooled products of combustion.

Figure 4:
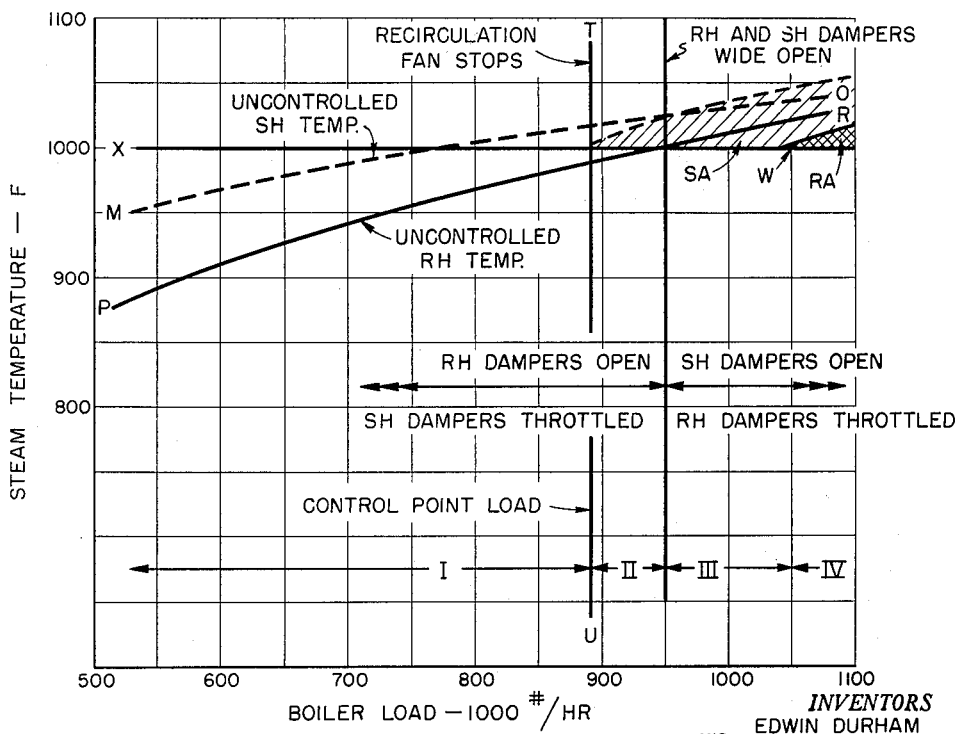
FIG. 4 is a graph of characteristics of convection superheating and reheating surfaces of a unit similar to that of FIG. 1.

The graph of FIG. 4 shows the expected design curve PR for uncontrolled reheat temperature and MO for uncontrolled superheat temperature. While these curves are of the same general shape they diverge with decrease in rating and the overall design is such that the average point between the two curves touches the 1000° F. desired final temperature value at "rated load." This we term "control point load." The "control point load" considered with respect to steam temperatures for multiple gas pass units as exemplified, might be defined as that load at which the gas flow from the furnace, when the fuel burning equipment is operated at optimum efficiency, has the correct total heat content to provide for superheating of the high pressure steam and for reheating of the low pressure steam to the optimum predetermined temperatures, there being no operating steps, such as gas recirculation, taken to modify the amount of heat absorption in the furnace. In a multiple pass unit the gas flowing from the furnace is so divided between the passes at the control point load operating rate that the optimum temperature of the superheat and reheat is attained. At loads between this control point load and a predetermined minimum load, the invention involves an increase in the heat content of the gases for maintaining the final superheat temperature, and this reference is to gases which first pass over the secondary superheater and then over both sections of the primary superheater. This increase in heat content is effected by a recirculating gas system extracting heating gas from near the entrance to the air heater.

The recirculated gas damper 68 is in a wide open position at a predetermined minimum load, and as the load increases from that point to the control point, the damper is gradually closed by the operation of the motive device 69.

The flow of recirculated gases is controlled from indications of rating and final steam temperature TS4. This action takes place from a minimum load of the order of 500,000 lb. of steam per hr. to the recirculation limiting control point, as indicated by line TU in FIG. 4. During this part of the operation, the reheater dampers 10 are wide open, and the primary superheater dampers 9 and 11 are operated concurrently with the regulation of recirculated gas damper 68 by the pertinent control elements from a visual indication of the reheat final temperature TR4. When a point corresponding to the reheater design point (say 950,000 load) is reached, the superheater dampers 9, 11 are wide open and remain wide open in the load range above or beyond that point.

Above the control point load indicated by line TU, superheated steam is attemperated by the spray attemperator 32 to keep its temperature at the predetermined value. To accomplish this, the operator observes the final steam temperature TS4 and operates the pushbutton to position the water spray valve 34 to regulate water flow an amount required to limit the final steam temperature to the desired value.

Through the upper load range (above the reheater design point), the reheater damper 10 is throttled by the operator by manual operation of means 76 according to the visual indication of reheat final temperature TR4. Thus, no water spray attemperation of reheat is required from the control point to a point W which is a load value of the order of 1,050,000 lb. of steam per hr. Above this load, and in the overload range to 1,100,000 lb. of steam per hr., it may be necessary to use spray water for reheat attemperation depending upon the extent to which it is considered desirable to limit the heat input into the superheater relative to reheater when considering various factors of which superheater metal temperature, steam pressure drop, and superheater draft loss, may be mentioned. When some such factor limits the load at which all of the attemperation is superheat attemperation then reheat attemperation is initiated for overload conditions. Although a considerable amount of spray water has been used for superheat attemperation between the control point (the line TU) and the load W, such use for superheated attemperation has no such detrimental effect upon the thermodynamic efficiency of the system as would be the use of a similar amount of spray water for reheat attemperation.

In the graph of FIG. 4, the line XW, from a load value of 550,000 to 1,050,000 lb. of steam per hr. represents the control of superheat steam temperature over that range. The curve MO represents the uncontrolled superheat temperature which would have obtained (with heat absorbing surfaces involved) without the use of the invention, and the line PR represents the uncontrolled reheat temperature which would have obtained without the use of the invention.

Inasmuch as the pressure and heat content per lb. of the low pressure steam returned to the reheater from the high pressure turbine exhaust decrease with reduction in load, while the pressure and heat content per lb. of the high pressure steam introduced to the superheater remains substantially constant with a corresponding variation in load, the customary installation of convection superheater and reheater will give a steam temperature-load graph which will slope downward from maximum load to low load with the result that delivery temperatures from both the superheater and the reheater will droop and the outlet temperature-load graph for the reheater will have a greater slope than the corresponding graph of the superheater. This is clearly shown by the relative curves MO and PR. In other words, they are of the same general curved characteristic but as load decreases they diverge from each other.

The shaded area designated SA (which is inclusive of RA) illustrates the extent of the load range through which superheat attemperation is effected, with the ordinates above line XW indicating the increase in amount of such spray attemperation with increase of load. The smaller shaded area RA illustrates the extent of the "overload" range through which reheat attemperation is effected and the ordinates above the level of line XW indicate the increase in the amount of spray water so used. It will be noted that area RA is relatively small as compared to SA and whatever use of spray water in the overload range is necessary will be of minor importance as regards the overall thermal efficiency of the plant which will usually operate below the 1,050,000 lb. per hr. load.

In the contemplated operation of the unit and apparatus exemplified through several phases, each involving a different load range, the following takes place with an increase in load from minimum to maximum.

In phase I, gas recirculation is at its maximum rate and the degree of the superheater path throttling is greatest at low load, the reheater gas path being unrestricted. As the load is increased through phase I to the start of phase II, the gas recirculation is reduced to zero, the throttling of the superheater gas path is reduced so that when phase II is entered the superheater is still throttled to some extent, and the reheater pass is unrestricted. The control point load TU lies between phases I and II.

In phase II, the reheater gas pass is continued in an unrestricted condition with further reduction in the restriction of gas flow in the superheater pass and with concurrent introduction and progressive increase in spray attemperation of superheated steam.

There is no restriction to gas flow in the superheater pass in phase III, but the reheater gas pass is progressively restricted, and attemperation of the superheater is progressively increased with increases in load.

In phase IV, the overload range, the superheater gas pass is unrestricted, restriction of the gas flow in the reheater gas pass is continued the same as at the termination of phase III, while attemperation is progressively increased in the superheater and attemperation of reheated steam is initiated and progressively increased. This is effected through operation of the pushbuttons (FIG. 5) by the operator, from indications of final reheat temperature TR4; or automatically by the sequential and relative operation of the control instrumentalities later to be explained.

It will be apparent, from a study of FIG. 4, that during phase (I) the recirculation of gases is regulated, either manually or automatically, to raise the uncontrolled characteristic curves PR and MO (to the left of the line TU) until the lower one (PR) coincides with the desired temperature line XW. If this were all that were accomplished it would mean that reheat temperature were brought to the desired value but that superheat temperature would lie considerably above the desired 1000° F. value. Concurrently with regulation of recirculated gases the proportioning dampers for the superheater and reheater parallel passes are so regulated as to divert some of the total gases away from the superheat passes and into the reheat pass. This serves a double function of taking heat away from the excessively highly superheated steam and adding heat to the reheated steam. By proper adjustment of recirculation rate and proportioning of the reheat-superheat dampers both the lines PR and MO are made to substantially coincide with the line XW. If, as for loads in phase II in bringing the reheat temperature up to the desired value, it is not feasible to entirely lower the final superheat temperature to the desired values then spray attemperation may be brought into play in the superheat portion of the cycle for extracting the excess heat therefrom.

As rating increases there is preferably a sequential operation between the recirculation and the attemperation with or without overlap as may be found necessary. As pointed out there is desirably a sequential operation between the reheat pass dampers and the superheat pass dampers and this sequential operation may be also sequential relative to the attemperation, depending upon design and operating conditions.

Referring now specifically to FIG. 6 we show therein an automatic control system for controlling the unit of FIG. 1 in accordance with our invention. Steam pressure as an index of demand, acting through a Bourdon tube, positions the moveable element of a pilot valve 80 to control the supply of fuel and air to the unit to satisfy demand. The pilot valve may be of a known type as disclosed in the Johnson Patent 2,054,464 and is so arranged that its air loading pressure output is continuously representative of steam pressure.

The temperature control for both the superheater and the reheater is with a minimum of spray attemperation, a minimum of recirculation, and a minimum of draft loss due to the sequential operation of the proportioning dampers. For the superheater the controls are arranged for sequential operation of spray attemperation at high load and flue gas recirculation for the lower loads. For the reheater the controls are arranged for sequential operation of the spray attemperation, if required at high loads, and the proper positioning of the proportioning dampers at all loads. The reheater obtains the full effect from the flue gas recirculation, the same as the superheater, both in response to changes of operation and in load range. The reheater and superheater are interlocked, temperature wise, to maintain a proper relationship for boiler load outside the control range such as at very low ratings.

FIG. 6 sets the pattern of the invention. While the other drawings show modification or changes in the control system necessitated because of the type of unit there under consideration, basically the invention is as will be described in connection with FIG. 6. We provide for temperature control at high loads by attemperation of both superheat and reheat steam, and temperature control at lower loads by flue gas recirculation and the proportioning of gas flow over parallel superheater and reheater passes.

For the superheater control the flue gas recirculation is controlled from three elements; boiler demand or load represented by total air flow or superheated steam flow, final superheat temperature, and recirculated gas flow. The spray attemperator operates from the three-elements; final superheat temperature, attemperator outlet temperature and boiler load. The primary load index is used only for superheat control. The temperature TS3 is useful only when the attemperator is in service (not on recirculation ratings) because when the attemperator is not in service then the temperatures TS2 and TS3 are the same. Consequently temperature TS3 is effective only on the attemperator valve.

The rating index AF represents a continuous measurement of air supplied for combustion, through the agency of an air flow rate meter 63 connected to be responsive to measured pressure differentials existing across a restriction at the outlet of the forced draft fan for example. Thus AF represents the air supplied for combustion and does not include any recirculated products of combustion. The meter 63 is arranged to position the movable element of a pilot valve 81 thereby establishing in the pipe 82 a pneumatic fluid pressure continuously representative of AF.

Final superheated steam temperature is measured by the device 65 arranged to position the moveable element of a pilot valve 83 and thereby establish in a pipe 84 a fluid loading pressure continuously representative of the value TS4.

The pipe 84 joins the A chamber of a standardizing relay 85 which may be of the type discribed and claimed in the Gorrie Patent Re. 21,804. Such a relay provides a proportional control with reset characteristics. It provides for the final control index TS4 a floating control of high sensitivity superimposed upon a positioning control of relatively low sensitivity. The function of the adjustable bleed connection 86 between the D and C chambers is to supplement the primary control of the pressure in pipe 84 with a secondary control of the same or of a different magnitude as a follow-up or supplemental action to prevent overtravel and hunting. The output of the relay 85, available in a pipe 87, is admitted to the A chamber of a totalizing relay 88, to the C chamber of which is connected the pipe 82. Relay 88 may be of the type described and claimed in the patent to Dickey 2,098,913 and its output is available in a pipe 89 leading to a manual-automatic selector station 90 which is preferably of the type disclosed in the patent to Fitch 2,202,485.

The output of the selector station 90 has a branch pipe 91 joining the A chamber of a relay 92, and a branch pipe 93 joining the A and C chambers of a relay 94. The output of relay 94, through a pipe 95, enters the A chamber of a differential standardizing relay 96 similar in function to relay 85. To the B chamber of the relay 96 is joined a pipe 97 having a fluid loading pressure continuously representative of the rate of flow of recirculated gas as measured by device 64. The output of relay 96 is available through a pipe 98 and selector station 99 to an accelerating relay 100 for control of a fluid pressure responsive motive means arranged to position the recirculated gas damper 68.

The temperature TS3 of the steam leaving the attemperator 32 is measured by the instrumentality 41 which is arranged to position the movable element of a pilot valve 101 thereby establishing in a pipe 102 a fluid loading pressure continuously representative of TS3. This loading pressure is subjected upon the C chamber of relay 92 whose output, available in a pipe 103, joins a calibrating relay 104 which positions the attemperator valve 34 by way of selector station 105 and pipe 106.

It will now be evident that we have described, in connection with FIG. 6 the control instrumentalities for the recirculation damper 68 and the attemperator 34 activated from four variables in the operation, namely TS4, AF, RGF and TS3. Final superheated steam temperature TS4 is the desideratum to be attained by this portion of the control system and provides the primary control in the A chamber of relay 88. An anticipating effect from the rating index AF provides a secondary control index for the relay 88. The resultant of these effects acts upon both the recirculating damper and the attemperator valve. In this portion of the system it will be seen that the demand for water spray attemperation is established primarily from two factors (TS4) and rating (AF). Therefore, if the actual amount of water sprayed into the attemperator is correct to accomplish the desired result then the temperature TS3 of the superheated steam leaving the attemperator will be as desired.

As rating increases from minimum the AF index will start the recirculation fan and effect a primary adjustment on the gas recirculation damper of approximately the right amount. A vernier control is effected from TS4 through the standardizing relay 85. The control impulse of pipe 95 is scanned by the impulse in pipe 97 (representative of measured RGF) to provide a readjustment if necessary. This functions to insure accurate positioning of the damper control drive so as to obtain a definite flue gas flow for each loading pressure in pipe 95 regardless of the damper characteristic and the recirculated gas flow static pressure. In similar manner the control impulse in pipe 91 is scanned by an impulse representative of TS3 to obtain a definite water flow rate for each loading pressure in pipe 91 regardless of valve characteristics, pump pressure, pipe line resistance, etc.

As rating continues to increase, the flue gas recirculation will be further and further reduced until the actuator of damper 68 reaches a predetermined minimum position at which point pressure switches will shut down the recirculation fan. This occurs at the control point load TU (FIG. 4). For further increases in rating, if TS4 tends to increase above the desired value, primary control from AF and TS3 will position the attemperator valve 34 approximately the right amount, with a final vernier adjustment from TS4.

The damper 68 and the attemperator valve 34 are desirably operated in sequence, with or without a slight overlap as may be demanded by design or operating conditions. Such sequential operation is readily obtained through adjustability of the calibrating relays 94, 104 which may be adjusted to permit the loading pressure of pipe 89 to position the recirculating damper and not affect the attemperator valve during the lower ratings.

The selector valve 90 allows for remote manual positioning of the damper 68 and of the valve 34, with the sequential interrelation, or by completely automatic control of the damper and valve under the same sequential conditions of operation, while selector stations 99 and 105 allow separate remote manual position of the damper and valve.

The control of reheat final temperature TR4 is accomplished simultaneously with the superheat control just described. Primary control from low loads up to the control point load where recirculation is discontinued, will be from changes in recirculation as determined by the superheat control. If, however, this does not produce the desired final RH temperature then the proportioning dampers at the exit of SH and RH will be adjusted by TS4—TR4 difference to maintain equality or a predetermined difference. The proportioning dampers are not separated as to the impulse 120 but the receiving drives are adjusted for sequential operation. The receiving drives for positioning the damper sets 9—11 and 10 may each be like the power drive shown in FIG. 8 of Gorrie et al. Patent 2,679,829 having a positioner (1) receiving a pneumatic signal through the pipe (133) from a relay (134). As disclosed in the Gorrie et al. Patent, the said positioners may be receptive to a pneumatic signal in the range 5–25 p.s.i.g. and may be individually so adjusted that the drive which positions the dampers 9—11 will accomplish a preselected travel when its positioner is subjected to a loading pressure increasing from 5 to 15 p.s.i.g. while the drive which positions the dampers 10 will accomplish its preselected travel as the pneumatic signal in pipe 120 increases from 15 to 25 p.s.i.g.; thus accomplishing a true sequential movement of dampers 9—11 and 10. Of course the positioning is in reverse sequence as the signal pressure in pipe 120 decreases from 25 down to 5 p.s.i.g. As disclosed in the present specification, the adjustment of the drive positioners may be such that an overlapping of movement of dampers occurs if desired.

For the reheat portion of the steam cycle we preferably separate the control of the attemperator valve 49 from control of the proportioning dampers 9, 10, 11. This because a control of the attemperator valve has no reactive effect upon the final temperature of the superheated steam whereas the proportioning dampers affect the final temperature not only of the reheated steam but also of the primary superheated steam. The control of the RH steam temperature will be effected by operation of the gas flow distribution dampers proportioning the total gases over the parallel paths. As the RH tends to increase above the control point, the RH damper will be throttled as required to reduce the gas flow over RH and divert it to the SH path. On the other hand, should the RH temperature tend to go below standard, the RH damper will be opened wide and if necessary the SH dampers will be throttled to force more gas through RH. Only one of the two sets of dampers will be throttled at any time, this being when the other has reached its limit of effectiveness. This true sequence is illustrated in FIG. 4. The sequential operation of the proportioning dampers where both are never throttled together provides minimum draft loss and a maximum effective control range.

On the assumption that TR4 and TS4 are to be maintained the same then any discrepancy or difference between the two is desirably corrected by way of the proportioning dampers 9, 10, and 11. We indicate the temperature difference meter 66 as having what is known as a center-zero and showing by departure therefrom as to whether TS4 is greater than, or less than, TR4. Correspondingly the air-loading pressure established in pipe 115 will continually subject upon the A chamber of a relay 116 a fluid loading pressure of predetermined amount if there is no difference between these two final temperatures, but the loading pressure will depart in one direction or the other depending upon one of the final temperatures becoming greater or less than the other.

The output of relay 116, available in a pipe 117, is subjected through a calibrating relay 118 and selector station 119 to be available in a pipe 120 for application to the control drives arranged to separately position the dampers 9, 10, 11. Usually the primary superheater dampers 9 and 11 would be operated together and as a group separately from the reheater dampers 10. Under certain conditions, it is desirable to further separate and individualize the control of dampers 9 as compared to dampers 11. In the present embodiment however, we consider dampers 9 and 11 as a group but separately regulated in proportion to the regulation accomplished by dampers 10.

We have indicated, in connection with FIGS. 1, 2 and 5, that the motive positioners for the valves and dampers may preferably be in the nature of electric motors. On the other hand (FIG. 6) the valves 34 and 49 are shown as fluid pressure actuated valves and we state here that the motive means for positioning the damper groups 9, 10 and 11 are in this case fluid pressure responsive motive devices of any of several well known forms. Usually these are piston actuated and include the necessary positioning devices for characterizing and interrelating the positioning as desired.

As the rating continues to increase, if the gas proportioning is unable to reduce RH temperature sufficiently then the RH attemperator valve is opened under the control of TR4 and TR3. Calibrating relays 112 and 118 allow adjustability of effectiveness and sensitivity between the proportioning damper control and the attemperator control and also allow sequential operation between the two.

At 110 we show a relay receiving in its A chamber a loading pressure continuously representative of TR3 while to the B chamber we apply a loading pressure continuously representative of TR4. The output of the relay, available in the pipe 111 is imposed upon the calibrating relay 112 whose output acts through the selector station 113 and a pipe 114 to position the water valve 49. It will thus be seen that temperature TR3, immediately representative of the effect of spraying water into the attemperator 47, provides an initial index dictating a positioning of the valve 49. In order to correct for poor valve characteristics and other deviants the final (desirably uniform) steam temperature TR4 is used as a check-back to readjust, if necessary, the position of the valve 49.

It will be understood that the final temperature of the superheated steam and the final temperature of the reheated steam may desirably be the same (1000° F. for example) as is indicated by the line XW of FIG. 4. However, under certain design and operating conditions it may be that there is desirably to be a fixed difference between the two final temperatures, for example, TS4 may preferably be 1000° F. while TR4 may preferably be 950° F. This is readily accomplished by a fixed biasing calibration so that all pressures and actions of the control system are as though the two temperatures TR4 and TS are to be the same while actually they are desirably to be maintained at a fixed difference.

The reheat will normally not require attemperation even at high loads as the reheater is always favored by proper control of gas flow over the reheater with or without the recirculation fan in service.

The parallel arrangement of superheater and reheater with its control has a distinct advantage over that of a series arrangement as for loads below the control range of either the recirculation equipment or the proportioning dampers, it will be possible to hold a fixed relationship between the reheater and superheater final temperatures. That is, the reheater and superheater temperatures may be made equal in value or held to a desired ratio or difference for all loads below the control range of the equipment. This fixed relationship between the reheater and superheat temperatures for low load operation is made possible by the TS4-TR4 difference controller 66 which primarily controls the proportioning dampers. This temperature difference controller is available at all loads, but at the higher loads where the temperatures are maintained at the proper level the temperature differential elements are relatively inactive. At low loads below the SH controllable rating we avoid the possibility of the control trying to maintain RH at the expense of SH.

Many of the larger units of present day design require dual or twin steam circuits and we have illustrated diagramatically in FIG. 7 the fluid circuit of such a unit with a very schematic representation of the gas flow path through the superheaters, reheater, and the recirculated gas passage. The general principles of our invention which we have described in connection with FIG. 6 apply equally as well to a twin circuit unit with additional features peculiar to the equalization of temperatures in the multiple circuits as well as for providing safe and efficient operation.

Steam leaving the separation drum of the unit passes to a header 125 supplying the primary superheaters 5, 6 which feed into a common header 126. Leaving the header 126 the A circuit steam of temperature TS2A passes through an attemperator S1, leaving at temperature TS3A. Similarly steam of the B circuit passes through an attemperator S2 and its outlet temperature is indicated as TS3B. The A and B circuits are crossed to join a common header 127 supplying the secondary superheater 4 which discharges to a header 128. Temperatures TS4A and TS4B designate the final steam temperatures joining in the conduit 44 to supply the high pressure turbine. Steam at relatively low pressure and temperature discharged from the high pressure turbine 45 through the conduit 46 divides to the reheat circuits A and B which are equipped with attemperators R1 and R2 respectively, and these discharge to the header 129 supplying the reheater 7 which then feeds the header 130 and the low pressure turbine 57.

Gases leaving the primary superheaters 5 and 6 are regulated by the dampers 9 and 11 respectively, while gases leaving the reheater 7 are regulated by the dampers 10. We diagrammatically show the recirculated gas duct 12 taking a portion of the gases from the several heaters, under the control of damper 68 as previously described.

The unit of FIG. 7 may be remotely manually controlled in accordance with the present invention by the arrangement of FIG. 12 to which has been applied the various additional measuring and controlling instrumentalities for the twin circuits.

FIG. 8 diagrammatically illustrates a pneumatic control system embodying our invention with a twin circuit steam generating, superheating and reheating unit, utilizing gas recirculation, as well as gas distribution over the parallel superheating and reheating passes. The design characteristics of this unit being such as to not require water spray attemperation in the reheat circuit, the control of RH temperature is entirely by the effect of recirculation over the lower ratings and with proportioning of the gases through the parallel paths. Gas proportioning may be effective for only a portion of the rating range or may be effective across the control point load, and may be adjusted to be operative in sequence with recirculation or attemperation.

Basically the indexes used and the control actions effected, for maintaining final superheated steam temperature at the desired value, are similar to those explained in connection with FIG. 6. The SH control has a primary control from load, secondary control from TS3, and a vernier control from TS4; for each of the A and B circuits. In this embodiment we preferably use as an index of rating the temperature TS2A, TS2B of the superheated steam at the entrance to attemperators S1 and S2 respectively. Any disturbance caused by changes in gas flow, excess air, rating, etc. as well as slagging and other furnace conditions is effective at the primary superheater outlet sufficiently in advance of reseulting changes or variations in final steam temperature as to make the index TS2 a valuable one in controlling the final temperature TS4.

We provide at 139 (and at 140) a comparing relay to which the three index loading pressures are subjected. The output of relay 139 leads directly to valve S1 while that of relay 140 leads directly to valve S2. Calibrating relays 142, 144 provide adjustability for the two valves to take care of valve characteristics, etc.

During the lower ratings, below the control point load, the attemperator valves S1 and S2 are both closed and the control of SH temperature is by gas recirculation as in FIG. 6. In the interest of maintaining the steam temperatures in the A and B circuits as nearly alike (or in desired relation) as is possible we selectively use the loading pressure output of relay 139 or relay 140 in control of the recirculation damper 68. Should we use (for example) the impulse of pipe 141 representative of the A circuit to control the recirculation gas rate the temperature conditions of the B circuit might be higher in which case a control from A circuit indexes would result in an excessively high B circuit temperature. Thus we preferably control recirculation selectively from the higher of the two circuits temperature-wise. The output of selective relay 145, in pipe 146, is the selected signal 141, or 143, whichever is the higher.

As a metering check-back to ascertain if the proper rate of flow of recirculation gas has been established in accordance with the demand, and to take care of characteristics of fans, dampers and the like, we further utilize the recirculated gas flow meter 64 to impress, through the pipe 97, a fluid loading pressure upon relay 148 in balancing opposition to that coming from the selective relay 145. Discrepancies in rate of flow of recirculated gas between that which is desired and the actual rate of flow appear as a loading pressure in the pipe 150 for positioning the damper 68.

In some instances it may be desired to utilize "fan power" of the recirculated gas fan as an index rather than rate of flow of the recirculated gas. Upon large units of the type under consideration it may be necessary on account of physical location, duct work, etc. and desirable for distribution to split the recirculated gas flow and have it enter the furnace at spaced locations. Distribution between the two portions is shown as being under the control of balancing dampers 155, 156. While damper 68 regulates the total flow of recirculated gases, the total may, in being split to the two sides, affect the final temperatures of the A and B circuits differently. Thus we provide that the recirculation balancing dampers 155, 156 are under the control of comparison relay 174 receptive of final reheat temperatures TR4A, TR4B.

Calibrating relays 142, 144, 149 provide the desired sequence control of recirculation and attemperation, with or without overlap as may be found necessary to prevent hunting. The adjustability of the various devices permits that the three-element impulse for the A circuit, established in the pipe 141, normally begins to open the attemperator valve S1 only (upon an increasing rating) at approximately the time that recirculating of gases is halted. Similarly the three-element control of superheated steam temperature for the B circuit, established as a fluid loading pressure in pipe 143, acts to begin to open attemperator valve S2 (upon increasing rating) at approximately the control point load. Thus the sequential operation primarily provides for the use of recirculation at ratings below the control point load and for attemperation above. However, the attemperators are available at any time and should emergency conditions or variations exist and final temperature tend to exceed the desired value, regardless of the rating, the proper attemperator will come into play to reduce the final steam temperature TS4A or TS4B.

Variations in the rate of recirculation will have an effect upon the final reheat steam temperature at the same time as affecting the final superheat temperature. Secondary or vernier control of the reheat temperature is accomplished by proportioning the total heating gases as between the parallel superheater and reheater passes.

In proportioning the gas flows over the superheater 5, 6 and reheater 7, the final temperature of the reheated steam in each of the two circuits is employed to take into account not only equivalency of the two final temperatures but also relation of the reheat final temperatures with the superheat final temperatures. A difference meter 160 is provided (similar to meter 66) for comparing the final steam temperature TS4A with the final steam temperature TR4A and in similar manner a difference meter 161 for the B circuit establishes a fluid loading pressure representative of comparison. This becomes in effect an anticipating index useful in correcting for undesirable variations in final steam temperature TS4 before they actually occur.

As in FIG. 6 the proportioning dampers are positioned responsive to final temperature difference responsive device TS4—TR4 for each of the twin circuits and the circuit showing the greatest divergence between the two final temperatures thereof is the circuit which dominates the proportioning. This is accomplished through the agency of selective relay 164 which selects, for pipe 165, the greatest temperature difference as shown up in loading pressures of pipes 162 and 163.

Signal 165 is led to the reheat damper control drives through a calibrating relay 167 and simultaneously to the superheat dampers 9, 11 through a calibrating relay 166. Inasmuch as there are two sets of superheat dampers 9, 11, the output of relay 166 is sent to both damper relays 168, 169.

By changing the gas flow balance as between the total reheat dampers and the total superheat dampers the superheater outlet temperatures TS4A and TS4B may tend to drift apart. Actually, any upset in operation that would affect the reheat temperatures should affect the superheat temperatures to the same degree. However, if there is a tendency for the superheater temperatures to drift apart, the superheater discharge dampers 5, 6 are biased and will maintain a proper balance. To individualize the superheat dampers 9 and 11, beyond only a comparison with reheat temperatures, we preferably bias the relays 168, 169 responsive to a comparison of the final SH temperature of the two circuits. For this we use a ratio relay 171 receptive of the fluid loading pressures (pipes 87A, 87B) representative of TS4A and TS4B. The resultant loading pressure in pipe 170 is applied oppositely to relays 168, 169. While the relay 171 is shown as a ratio relay this may desirably be a difference or similar comparison type of relay.

This arrangement will not alter the sequential operation of the superheater and reheater dampers. Furthermore, the superheater attemperators are always standing by just in case the superheater outlet temperature on either side should climb too high for a short time. Biasing of the superheater dampers 9, 11 is imposed on top superheater gas passes which is impulsed by reheat temperature.

FIG. 9 illustrates a pneumatic control system for the same general type of unit described in connection with FIG. 8, namely, a twin steam circuit unit employing recirculation, with attemperation in the superheated steam portion of the circuit, with proportioning of the total gas flow over the parallel superheater and reheater passes and without attemperation in the reheat portion of the circuit. Herein we employ a principle disclosed and claimed in the copending application S.N. 283,275 by Paul S. Dickey of basically comparing the mass heat flow of the gases contacting the convection heating surfaces with the mass heat flow of the steam being superheated or reheated. The anticipating effect resulting from such comparison is of particular benefit in recirculated gas installations and, in certain instances, supplants the use of a rating index and a recirculated gas flow measuring index. Such a system, including the features of our invention is illustrated in FIG. 9 and will now be described.

The fluid loading pressures representative of TS3A and TS4A join a relay 139 whose output in a pipe 141 serves to position the attemperator valve S1. Similarly the effects representative of TS3B and TS4B are imposed upon a relay 140 whose output in pipe 143 serves to position the attemperator valve S2.

The recirculated gas damper 68 is under the conjoint control of the output in pipe 146, a measurement of steam flow, and a measurement of mass heat flow rate. These three effects are imposed upon a relay 175 whose output, acting through a standardizing relay 176, is available in the conduit 177 for positioning the damper 68. It is now advisable to explain the establishment of a fluid loading pressure in pipe 178 representative continuously of mass heat flow rate over the convection heating surfaces.

In connection with FIG. 1 we mentioned the pressure connections 25, 26 at chosen locations in the gas flow path over at least a portion of the superheating surfaces. We preferably duplicate this measurement for each of the three passes i.e. the reheater pass 7 and the two superheater passes 5 and 6. As diagrammatically indicated in FIG. 1 the pressure taps 25, 26 are connected to a measuring device 180 which is arranged to effectively average or totalize the rate of gas flow through the three parallel passes. This total mass flow, compensated for average gas temperature TG, in mass heat flow meter 181, establishes in the pipe 178 a fluid loading pressure continuously representative of mass heat flow over the convection heating surfaces.

The temperature of the heating gases leaving the unit at dampers 9, 10 and 11, or even at location 21 prior to the economizer 8, does not vary materially with rating or furnace operation. On the other hand the temperature of the gases entering the superheating paths as at locations 23, 20 will vary widely both with rate of unit operation as well as with furnace conditions, heat absorption in the furnace, recirculation of gases, etc. Thus a considerable span in the travel path of the gases between the furnace and the dampers exists wherein a temperature measurement will reflect, to a lesser degree but still representative thereof, entering temperature variation of the gases and at a measurably lower gas temperature. Preferably we employ a measurement at about the location designated TG in FIG. 1 and would probably employ temperature sensitive elements similar to those designated 24. Through this agency we may ascertain the temperature of the gases contacting the superheaters 5, 6 and reheater 7, separately or as an average.

The location TG for temperature measurement of the gases contacting the convection heating surfaces will be somewhere along the heat exchange surfaces where the temperature will reflect furnace temperature and firing conditions prior to fluctuations in steam temperature within the superheating surfaces which would be a result of the changed firing condition. Thus, the temperatures at TG are chosen as "cause" indexes rather than making use of "result" indexes. The primary purpose of the present invention is to maintain the final total temperature TS4 of the steam and TR4 of the reheated steam each as nearly constant at the optimum or desired value as is possible regardless of variations in demand upon the unit as a whole.

As pointed out in greater detail in the Dickey application the convection heating surfaces are, in effect, a heat exchanger in which for every load (SF) we may obtain a value for $(Qg \cdot TG)$, compare values (SF) and $(Qg \cdot TG)$ to see if the heat supply rate is right for the heat demand rate, control the heat supply rate until it is equal to the demand rate, and check back from a measure TS4 of the final steam temperature to take care of any discrepancies. Another way of stating this is that we provide a three-element control. We control heat input rate to satisfy heat demand and correct the rate of heat input if the balance does not result in the desired final heat level (temperature) of the output.

$$SF \cdot K = \frac{Qg \cdot TG \cdot K'}{TS4}$$

It will be observed that this is exactly what the control instrumentalities of FIG. 9 accomplish. The relay 175 receives a loading pressure representative of SF as well as a loading pressure representative of mass heat flow. It compares these loading pressures and has a check-back from the pipe 146 representative of the higher (or lower) of the final steam temperatures TS4A, TS4B through the agency of selective relay 145. The output of the relay 175, acting through the standardizing relay 176 is available through a pipe 177 for positioning the recirculating gas damper 68 to regulate the mass heat flow of the gases passing over the convection heating surfaces.

The control of gas mass heat flow or "heat available rate" to satisfy "steam mass heat flow required" (to compensate for the anticipated steam temperature change with changes in rating and furnace conditions) provides a desirable basis of more directly going to the source of changes affecting final steam temperature (and anticipating the effect) than to depend only on a load index (steam flow rate or air flow rate) with a check-back from final steam temperature.

Control of proportioning of the heating gas flow between the two superheater passes 5, 6 and the reheater pass 7, is conjointly from a measure of mass heat flow rate and temperature difference between the final superheated steam temperature TS4 and the final reheat temperature TR4. The temperature difference meter 66 establishes a loading pressure in the pipe 115 acting through the standardizing relay 116 and output pipe 117 upon the A chamber of a comparing relay 185 which receives in its C chamber a loading pressure from the pipe 178 representative of mass heat flow rate. Thus mass heat flow rate, which is effected by recirculation of partially cooled heating gases and is a measure of the available heat in the gases, is primarily effective in the reheat control relay 167 and the superheat control relay 166 for proportioning the gases. The second element in the control is the temperature difference between TS4 and TR4. As in FIG. 8, the output of relay 166 is applied to the relays 168, 169 with the effect of these relays biased by the loading pressure in pipe 170.

FIG. 10 is somewhat analogous to FIG. 6 except that in FIG. 10 we show a twin circuit with attemperation in both the superheating and reheating portions although, as previously explained, the entire arrangement is such as to minimize the amount of attemperation used in the reheat portion of the circuit.

The attemperator valve S1 for the A circuit is under the conjoint control of final superheated steam temperature TS4A, steam temperature TS3A following the attemperator, and a load index AF. These three variables act through the relay 139 to establish in the pipe 141 a fluid loading pressure for positioning the valve S1. In the same manner the B circuit values TS4B, TS3B and AF coact to establish in a pipe 143 a fluid loading pressure for positioning the attemperator valve S2 of the B circuit. Calibrating relays 190, 191 are provided for adjusting the effect of loading pressures 141, 143 upon the valves.

The index (AF) establishes a control loading pressure proportional to the rating being carried by the unit. Assume that the boiler is being operated at a low rating, the maximum amount of flue gases being recirculated, no attemperation being used and the final superheated steam temperature and final reheated stem temperature are both below standard.

As the boiler rating increases, we approach a value in rating, previously determined, where the final superheated steam temperature reaches standard. At this point, the load responsive controller, anticipating that the effect of a load increase on the boiler will result in a final superheat temperature higher than standard, will throttle the gas recirculation control dampers approximately the right amount to keep the final temperature at normal. Final adjustment of the recirculation dampers will be obtained through the controllers which respond to changes in superheat steam temperature, acting through the standardizing relays and through a selective relay so that the steam temperature device at the outlet of either secondary superheater can call for a readjustment.

If the boiler rating continues to increase, the flue gas recirculation will be further and further reduced until it is practically zero. This will be at a steam load of approximately 890,000 lb. per hr., a point where recirculation is discontinued and it will be necessary to begin attemperation between the primary and secondary superheaters in order to maintain the final superheat temperature. For further increases in rating, the rate of attemperation increases. Control of the final superheated steam temperature from this point is entirely by regulating the amount of water spray to the attemperator nozzles.

Basically then, the superheated steam temperature is controlled by regulating the volume of gas recirculated, up to the point where recirculation is no longer required. From this point on regulating the water for attemperation. The calibrating relays indicated on the drawing provide this sequential control. They will be so adjusted as to permit the loading pressure from the controllers to reach the recirculating damper drives only up to the value which calls for these dampers to be closed and then to reach the attemperator valves only as rating increases above this point.

The second anticipatory index, in addition to the load index, is provided by a controller which responds to changes in the temperature of the superheated steam following the superheat attemperator so that when spray water is being used on the superheat control, the anticipation can come from two separate sources, load and attemperator outlet temperature. This second anticipating index TS3 is included to anticipate changes in final superheat temperature which may be brought about by changes in firing conditions or changes in the condition of the heating surfaces of the generator and superheater rather than by load changes.

The flue gas recirculation control has a recirculation gas flow element that provides a dampening effect and minimizes poor damper characteristics. This is most important for two-fan arrangement. As in FIG. 6 the recirculated gas flow rate meter RGF is used in control of the recirculation damper 68 and with this measurement is utilized the highest of the impulses in pipes 141, 143. These latter two impulses are impressed upon a selective relay 192 and the highest of the two effects acts through an output pipe 193 and calibrating relay 194 upon the differential standardizing relay 96.

In the reheat portion of the cycle attemperator valve R1 is under the conjoint control of reheated steam temperature TR3A following the attemperator and of final reheat steam temperature TR4A, acting upon the differential relay 196. In similar fashion the variables TR3B and TR4B act through a differential relay 197 to position the attemperator valve R2 for the B circuit.

The controller on the proportioning dampers utilizes a temperature difference rather than a straight final reheat temperature controller, both acting through a selective relay. By the use of this controller, when the boiler is operated below the point at which superheat steam temperature is controllable, we avoid the possibility of the control trying to maintain reheat temperature at the expense of superheat temperature. This controller is capable of being adjusted to maintain zero difference in temperature between reheat and superheat final temperatures, or a positive or negative differential, whichever is found to be most desirable.

Control of the proportioning of the gas flows through the superheaters 5, 6 and the reheater 7 is by a comparison between temperature differences TR4A—TS4A and TR4B—TS4B. The former temperature difference is developed in a pipe 198, while the latter temperature difference is developed in a pipe 199. The pipes 198, 199 are effective upon a selector relay 200 whose output in a pipe 201 is subjected upon a calibrating relay 202 controlling the dampers 9, 10 and 11 in proper sequence and proportion as previously explained. The temperature difference relays control only the superheater and reheater proportioning damper drives, rather than including the attemperating water. This is done because as a difference system, if the difference calls for adding attemperating water it would do it without regard to the actual temperature and might add water at low ratings. It is much better to have the water controlled primarily by the reheater outlet temperature only with readjustment from the temperature at the reheater inlet. This more nearly parallels the superheater side where the superheat temperature controls the attemperating water with readjustment from temperature entering the secondary superheater.

FIG. 11 is similar to FIG. 10 except that it is based on the mass heat flow theory. As boiler rating increases to a load, previously determined, where the final superheat steam temperature reaches standard, the superheated steam flow responsive controller, anticipating that the effect of a further load increase on the boiler will result in a final temperature TS4 higher than standard, will throttle the gas recirculation control dampers approximately the right amount to keep the final temperature at normal. Totalized mass flow compensated for gas temperature balances the superheated steam flow when the change called for by load is correct. Final adjustment of the recirculation dampers will be obtained through the controllers which respond to changes in superheat steam temperature, acting through the standardizing relays as shown and through a selector valve 145A so that the steam temperature device at the outlet of either secondary superheater can call for a readjustment.

The system will be adjusted to permit the loading pressure from the controllers to reach the recirculating damper drive up to the value which calls for these dampers to be closed and then to reach the attemperator control valves as the rating continues to increase. The standardizing relays included with the superheater outlet temperature controllers will be adjusted to override the calibrating relay and open the attemperator valves in case final steam temperature would tend to exceed the desired standard, even though the boiler load had not exhausted the possibilities of gas recirculation.

As a secondary anticipating index we provide a controller which responds to changes in the temperature of the superheated steam following the attemperator so that when spray water is being used in the superheat control the anticipation can come from two separate sources, load and attemperator outlet temperature.

The temperature out of either secondary superheater can call for a reduction in the volume of the gas recirculation. By means of the selector relay 145A in the control circuit to the recirculating damper whichever secondary superheater outlet temperature is lowest will call for changes in recirculation.

For reheat control it is desirable to consider what happens to the temperature of the steam at the outlet of the reheaters when changes are made in the volume of gas recirculated by the superheat temperature control system just described. For an increase in rating, the recirculation is decreased and this, of course, affects the final reheat temperature as well as the final superheat temperature. The compensated mass gas flow, balancing the superheated steam flow changes, produces an approximate primary adjustment of the gas distribution dampers, to change the gas flow through the superheater-reheater passes, to suit the boiler characteristics and anticipate changes in reheater outlet temperature. If the changes which are made in the recirculation do not result in the desired final reheat steam temperature, a controller responsive to the temperature of the steam at the reheater outlet readjusts the dampers which distribute the gases over the separate superheater and reheater sections. Changes in this distribution of the gases also affect the steam leaving both superheaters. This in turn causes the superheat temperature control to readjust the gas recirculation volume and by repetitive adjustments of the recirculation and gas distribution the superheat and reheat temperatures are finally stabilized at the desired value. It will be appreciated that these adjustments and readjustments may go on simultaneously.

In the reheat cycle the control is similar to that of FIG. 10 wherein attemperator valve R1 is under the conjoint control of TR3A and TR4A through relay 196. Attemperator valve R2 is under the conjoint control of TR3B and TR4B under the action of relay 197. The selective relay 200 selects between the temperature difference TS4A—TR4A and the difference TS4B—TR4B and applies a loading pressure representative thereof to a relay 185. Additionally, over FIG. 10 however, the mass heat flow effect in pipe 178, acting through a calibrating relay 213, is imposed upon the relay 185 whose output in the pipe 165 goes to the proportioning dampers 9—10 and 11.

We utilize the leading pressure proportional to mass gas flow compensated for average gas temperature to position the dampers which distribute the gases over the superheater and reheater surfaces direct, rather than using the combined index of load balanced against compensated mass gas flow, based on the consideration that the proportioning dampers control distribution and not quantity. Therefore we do not believe it advisable to position these dampers from the total B.t.u. requirement index (steam flow) balanced against total B.t.u. available index (compensated mass gas flow), which is primarily a quantity control. We feel that more stable control will be obtained by providing initial positioning of the distribution dampers from the B.t.u. available index only.

In FIG. 12 we illustrate a manual control station, similar to that of FIG. 5, but including additionally the measuring and controlling devices necessary to manually carry out our invention in connection with a twin circuit unit.

Reference may be had to the copending application of Edwin Durham, Serial Number 258,962, now Patent No. 2,830,440.

While we have chosen to illustrate and describe our invention in certain preferred environments, modes and apparatus, it will be understood that this is by way of illustration only and not to be considered as a limitation.

What we claim as new, and desire to secure by Letters Patent of the United States, is:

1. The method of operating a vapor generating unit having a convection superheater and a convection reheater disposed respectively in divided and separate parallel gas flow paths from a common combustion zone, the superheater and reheater having uncontrolled load-temperature characteristic curves with different degrees of slope; the method including varying the heat availability of the heating gases passing over the superheater and reheater in direction to increase heat availability as superheat and reheat temperatures drop and vice versa to maintain superheat and reheat temperatures at predetermined values through a load range below a predetermined control point load, limiting upper superheat temperature value by liquid spray attemperation through a load range above the control point load, and proportioning heating gas flow between the parallel convection heating paths through both load ranges, the proportioning being generally to divide the total heating gas flow between the heating paths in direction to increase the proportion supplied to that one of the paths whose final heated vapor temperature has decreased in value relative to the other final heated vapor temperature upon departure of such temperatures from predetermined relation regardless of their actual value and so accomplished during operation through at least a portion of the total controllable load range that gas flow is throttled through only one of the parallel paths at a time.

2. The method of claim 1 wherein the proportioning is further so accomplished through selectively throttling the gas flow over the superheater only or over the reheater only selectively in accordance with the predominance of one of the final vapor temperatures over the other.

3. Apparatus arranged to automatically control the heating of vapor in a generating unit having a convection heated tubular superheat vapor path and a convection heated tubular reheat vapor path disposed respectively in divided and separate materially confined parallel gas flow paths from a common structurally defined combustion zone, the superheater and reheater having generally similar uncontrolled load-temperature characteristic curves with different degrees of slope, including in combination, apparatus adapted to automatically regulate the heat availability of the total heating gases passing over the superheater and reheater to maintain superheat and reheat outlet temperatures at predetermined values through a load range below a predetermined control point load, other apparatus including a liquid spray attemperator adapted to automatically limit superheat temperature through a load range above the control point load, load responsive means controlling the said apparatus and the said other apparatus, separate damper means for the parallel gas flow paths, and control devices arranged to position said dampers thus proportioning the total heating gas flow between the parallel paths operating generally to divide the total heating gas flow between the heating paths in direction to increase the proportion supplied to that one of the paths whose final heated vapor temperature has decreased in value relative to the other final heated vapor temperature upon departure of such temperatures from predetermined relation regardless of their actual value and through a portion at least of the total controllable load range by variably restricting gas flow through one of said paths while allowing unrestricted gas flow through another of the paths.

4. The combination of claim 3 including comparison means continuously comparing the values of final superheat and reheat temperatures, said comparison means arranged to selectively actuate the control devices for picking the flow path to be restricted selectively in accordance with predominance of one of the final vapor temperatures over the other.

5. Apparatus arranged to automatically control the heating of vapor in a generating unit having a convection heated tubular superheat vapor path and a convection heated tubular reheat vapor path disposed respectively in divided and separate materially confined parallel gas flow paths from a common structurally defined combustion zone, the superheater and reheater having generally similar uncontrolled load-temperature characteristic curves with different degrees of slope, including in combination, damper means adapted to regulate the flow rate of heating gases over the reheater, a first measuring apparatus sensitive to the final superheated vapor temperature and the final reheated vapor temperature for comparing the two and arranged to control the said damper means in response to the comparison, an attemperator for adding attemperating liquid to the superheater vapor path, and a second measuring apparatus sensitive to final superheated vapor temperature arranged to control the attemperator.

6. The method of controlling the operation of a vapor generating unit having a convection superheater and a convection reheater disposed respectively in divided and separate parallel gas flow paths from a common combustion zone, the superheater and reheater having generally similar uncontrolled load-temperature characteristic curves with different degrees of slope; including the steps of controllably varying the heat availability of the heating gases passing over the superheater and reheater in level and amount to maintain final superheat and reheat temperatures at predetermined values through a load range below a predetermined control point load continuously responsive to measured final superheat temperature in direction tending to increase heat availability as final superheat temperature decreases and vice versa, controlling the flow rate of heating gases over the reheater in continuous response to a comparison of the final reheated vapor temperature with the final superheated vapor temperature in direction tending to return the two temperatures to predetermined relation upon departure therefrom, limiting superheat temperatures by spray attemperation through a load range above the control point load, determining a temperature of the vapor flowing through the superheater, and controlling the admission of atemperating liquid to the vapor of the superheater stream in continuous response to such determination through ratings above the control point load and in direction tending to increase the rate of admission as superheated vapor temperature increases and vice versa.

7. The method of claim 6 wherein the heat availability is varied by controllably recirculating partially cooled products of combustion from beyond the convection heating surfaces back to the entrance of the surfaces.

8. Apparatus arranged to automatically control the heating of vapor in a generating unit having a convection heated tubular superheat vapor path and a convection heated tubular reheat vapor path disposed respectively in divided and separate materially confined parallel gas flow paths from a common structurally defined combustion zone, the superheater and reheater having generally similar uncontrolled load-temperature characteristic curves with different degrees of slope, including in combination, fan and damper means adapted to recirculate partially cooled products of combustion from beyond the convection heating surfaces gas flow-wise back to the entrance of said surfaces through a load range below a predetermined control point load to vary the heat availability of the heating gases contacting said surfaces, measuring means of the final superheated vapor temperature arranged to control the said fan and damper means, an attemperator for adding attemperating liquid to the superheater vapor path, the measuring means also arranged to control the attemperator through a load range above said control point load, damper means arranged to proportion the total flow of heating gases between the superheater path and the reheater gas flow path through a range of ratings above the control point load to maintain final reheated vapor temperature and to minimize spray attemperation, and a second measuring apparatus sensitive to the final superheated vapor temperature and the final reheated vapor temperature for comparing the two and arranged to control the said damper means in accordance with the comparison.

9. The method of operating a vapor generating unit having a convection superheater and a convection reheater disposed respectively in divided and separate parallel gas flow paths from a common combustion zone, the superheater and reheater having generally similar uncontrolled load-temperature characteristic curves with different degrees of slope; the method including introducing fuel and air for combustion into the combustion zone spaced from the heating gas outlet at a rate to satisfy demand upon the unit, varying the heat availability of the heating gases leaving the combustion zone to the parallel paths to maintain superheat and reheat temperatures at predetermined values through a load range below a predetermined control point load and in direction tending to increase the heat availability to the path whose vapor temperature tends to fall below predetermined relation to the temperature of the other vapor flow and vice versa acting in accordance with an index of rating and final superheated vapor temperature, limiting superheated vapor temperature by liquid spray attemperation in accordance with the index of rating as well as superheat vapor temperature after the attemperation and final superheat vapor temperature in direction tending to increase attemperation as superheated vapor temperature tends to increase and vice versa, limiting reheat vapor temperature by liquid spray attemperation in accordance with reheat vapor temperature after the attemperation and final reheat vapor temperature in direction tending to increase attemperation as reheat vapor temperature tends to increase and vice versa, and proportioning heating gas flow between the parallel convection paths through the controllable load range across the control point load in accordance with the temperature difference of the final superheated and reheated vapor streams.

10. The method of claim 9 wherein the index of demand is generated vapor pressure.

11. The method of claim 9 wherein the rating index is rate of flow of generated vapor.

12. The method of claim 9 wherein the rating index is rate of flow of gaseous products of combustion and excess air resulting from the combustion process.

13. The method of claim 9 wherein the heat availability of the heating gases is regulated by recirculating partially cooled products of combustion from beyond the parallel convection heating paths back to the combustion zone.

14. The method of claim 13 including readjustment of recirculation rate if necessary in accordance with measured recirculated gas flow rate.

15. The method of claim 13 wherein the recirculation is through a range of lower ratings while the attemperation is through a range of upper ratings, relative to the control point load, the two regulations being sequentially carried out in accordance with rating.

16. The method of claim 15 wherein the sequential operation of the recirculation and attemperation is overlapping across the control point load.

17. Apparatus arranged to control the heating of vapor in a generating unit having a convection heated tubular superheat vapor path and a convection heated tubular reheat vapor path disposed respectively in divided and separate materially confined parallel gas flow paths from a common structurally defined combustion zone, the superheater and reheater having generally similar uncontrolled load-temperature characteristic curves with different degrees of slope, including in combination, a controllable supply of the elements of combustion for the zone, control means for the supply sensitive to demand upon the unit, fan and damper means arranged to recirculate partially cooled heating gas from beyond the parallel convection heating paths back to the combustion zone, rating determining means for the unit, final superheated vapor temperature $TS_4$ determining means, adjusting means for regulating the recirculation means conjointly responsive to the two determining means, a first liquid spray attemperator for the superheat vapor path and a second spray attemperator for the reheat vapor path, temperature $TS_3$ determining means of the superheat vapor leaving the first attemperator, temperature $TR_3$ determining means of the reheat vapor leaving the second attemperator, final reheated vapor temperature TR4 determining means, first regulating means for the first attemperator conjointly responsive to the rating determining means and the TS4 means and the TS3 means, second regulating means for the second attemperator conjointly responsive to the TR3 means and the TR4 means, first damper means for regulating the flow of gases over the superheater path, second damper means for regulating the flow of gases over the reheater path, and control means for proportioning the heating gases over the superheater and reheater surfaces through positioning the first and second damper means conjointly responsive to comparison of TS4 and TR4.

18. The combination of claim 17 including generated vapor pressure determining means representative of demand to which the first control means is responsive.

19. The combination of claim 17 wherein the rating determining means is a generated vapor flow rate meter.

20. The combination of claim 17 wherein the rating determining means is a flow rate meter of the products of combustion and excess air not including recirculated gas.

21. The combination of claim 17 including means coacting with the recirculation adjusting means and the first and second attemperator regulating means sequentially activating the recirculation and the attemperation over preselected ranges of unit operation.

22. The combination of claim 17 including a rate of flow meter of the recirculated gases, and readjusting means for the recirculation adjusting means responsive to said meter.

23. The method of operating a vapor generating unit having a convection superheater and a convection reheater disposed respectively in divided and separate parallel gas flow paths from a common combustion zone, the superheater and reheater having uncontrolled load-temperature characteristic curves with different degrees of slope; the method including varying the heat availability of the heating gases passing over the superheater and reheater to maintain superheat and reheat temperatures at predetermined values through a load range below a predetermined control point load by controllably recirculating a portion of the partially cooled heating gases following the convection paths back to the combustion zone in direction tending to increase heat availability as superheat and reheat temperatures tend to decrease and vice versa, limiting superheat temperature by liquid spray attemperation through a load range above the control point load in direction tending to increase the attemperation as superheat temperature tends to increase and vice versa, and proportioning heating gas flow between the parallel convection heating paths through both load ranges, the proportioning being generally to divide the total heating gas flow between the heating paths in direction to increase the proportion supplied to that one of the paths whose final heated vapor temperature has decreased in value relative to the other final heated vapor temperature upon departure of such temperatures from predetermined relation regardless of their actual value and so accomplished during operation through at least a portion of the total controllable load range that gas flow is throttled through only one of the parallel paths at a time.

References Cited in the file of this patent

UNITED STATES PATENTS

| | | |
|---|---|---|
| 1,387,463 | Broido | Aug. 16, 1921 |
| 1,975,085 | Dickey | Oct. 2, 1934 |
| 2,229,643 | De Baufre | Jan. 28, 1941 |
| 2,252,367 | Germer | Aug. 12, 1941 |
| 2,298,700 | Junkins et al. | Oct. 13, 1942 |
| 2,526,898 | Powell et al. | Oct. 24, 1950 |
| 2,550,683 | Fletcher et al. | May 1, 1951 |
| 2,572,253 | Fellows et al. | Oct. 23, 1951 |
| 2,579,027 | Walter et al. | Dec. 18, 1951 |
| 2,590,712 | Lacerenza | Mar. 25, 1952 |
| 2,649,079 | Van Brunt | Aug. 18, 1953 |
| 2,730,080 | Stallkamp | Jan. 10, 1956 |
| 2,737,930 | Rowand et al. | Mar. 13, 1956 |

FOREIGN PATENTS

| | | |
|---|---|---|
| 979,248 | France | Dec. 6, 1950 |
| 504,114 | Great Britain | Apr. 14, 1939 |
| 523,871 | Great Britain | July 24, 1940 |
| 525,906 | Great Britain | Sept. 6, 1940 |

OTHER REFERENCES

B & W Bulletin G—67 of 1949, page 30.

UNITED STATES PATENT OFFICE
CERTIFICATE OF CORRECTION

Patent No. 3,028,844                        April 10, 1962

Edwin Durham et al.

It is hereby certified that error appears in the above numbered patent requiring correction and that the said Letters Patent should read as corrected below.

Column 2, line 40, for "thet" read -- the --; column 4, line 39, for "wtih" read -- with --; column 16, line 62, after "on top" insert -- of the sequence operation between the reheater and --; column 21, line 39, for "leading" read -- loading --.

Signed and sealed this 6th day of November 1962.

(SEAL)
Attest:

ERNEST W. SWIDER
Attesting Officer

DAVID L. LADD
Commissioner of Patents